United States Patent
Dhesikan et al.

(10) Patent No.: US 10,560,359 B2
(45) Date of Patent: Feb. 11, 2020

(54) METHOD AND DEVICE FOR REDUCING MULTICAST FLOW JOINT LATENCY

(71) Applicant: Cisco Technology, Inc., San Jose, CA (US)

(72) Inventors: Subhasri Dhesikan, San Jose, CA (US); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 15/389,960

(22) Filed: Dec. 23, 2016

(65) Prior Publication Data

US 2018/0183697 A1 Jun. 28, 2018

(51) Int. Cl.
*H04L 12/28* (2006.01)
*H04L 12/26* (2006.01)
*H04L 12/761* (2013.01)
*H04L 12/18* (2006.01)

(52) U.S. Cl.
CPC ........ *H04L 43/0882* (2013.01); *H04L 12/185* (2013.01); *H04L 45/16* (2013.01)

(58) Field of Classification Search
CPC ....... H04L 45/16; H04L 12/18; H04L 12/185; H04L 12/1886; H04L 12/4641; H04L 47/726
See application file for complete search history.

(56) References Cited

U.S. PATENT DOCUMENTS

| | | | |
|---|---|---|---|
| 7,933,267 B1 | 4/2011 | Aggarwal et al. | |
| 8,392,605 B2 | 3/2013 | Huang et al. | |
| 9,300,591 B2 | 3/2016 | Rajasekaran et al. | |
| 2002/0072383 A1* | 6/2002 | Helm | H04L 47/15 455/509 |
| 2003/0002448 A1* | 1/2003 | Laursen | H04L 12/1827 370/261 |
| 2003/0073453 A1* | 4/2003 | Basilier | H04L 12/185 455/503 |
| 2004/0218595 A1* | 11/2004 | Acharya | H04L 45/00 370/389 |

(Continued)

FOREIGN PATENT DOCUMENTS

| | | |
|---|---|---|
| CN | 102480692 B | 2/2015 |
| CN | 104683244 A | 6/2015 |
| WO | 2016019527 A1 | 2/2016 |

*Primary Examiner* — Atique Ahmed
(74) *Attorney, Agent, or Firm* — Merchant & Gould P.C.

(57) ABSTRACT

In one embodiment, a method includes determining a first node as a current termination node of a first multicast flow; determining whether a link between the first node and a downstream next-hop node has available bandwidth to accommodate the first multicast flow, where the downstream next-hop node is not currently associated with the first multicast flow; and transmitting the first multicast flow to the downstream next-hop node according to a determination that the link between the first node and a downstream next-hop node has available bandwidth to accommodate the first multicast flow. According to some implementations, the method is performed by a controller with one or more processors and non-transitory memory, where the controller is communicatively coupled to a plurality of network nodes in a network.

20 Claims, 16 Drawing Sheets

(56) References Cited

U.S. PATENT DOCUMENTS

| | | | |
|---|---|---|---|
| 2004/0258066 A1* | 12/2004 | Chen | H04L 12/1877 |
| | | | 370/390 |
| 2005/0129017 A1 | 6/2005 | Guingo et al. | |
| 2006/0074968 A1* | 4/2006 | Gyetko | H04L 12/1886 |
| 2006/0268871 A1* | 11/2006 | Van Zijst | H04L 12/1836 |
| | | | 370/390 |
| 2007/0201365 A1* | 8/2007 | Skoog | H04L 47/10 |
| | | | 370/230.1 |
| 2009/0175274 A1* | 7/2009 | Aggarwal | H04L 12/1886 |
| | | | 370/390 |
| 2009/0252033 A1* | 10/2009 | Ramakrishnan | H04L 12/18 |
| | | | 370/228 |
| 2011/0019534 A1* | 1/2011 | Ramakrishnan | H04L 45/00 |
| | | | 370/217 |
| 2013/0114595 A1* | 5/2013 | Mack-Crane | H04L 45/16 |
| | | | 370/390 |

\* cited by examiner

METHOD AND DEVICE FOR REDUCING MULTICAST FLOW JOINT LATENCY

TECHNICAL FIELD

The present disclosure generally relates to network routing, and in particular, to systems, methods, and devices for reducing multicast flow join latency.

BACKGROUND

There are many situations, such as live broadcast production or distribution, where an operator or host wishes to start and stop the transmission of flows (e.g., audio data, video data, metadata, media content, and/or the like) with as little latency as possible. Current Internet Protocol (IP) based systems, however, cannot support industry standards for latency in live broadcast production due to the host-driven nature of the Internet Group Management Protocol (IGMP) for multicast IP flows. The current response time to IGMP join and leave requests is dependent on multiple factors such as hardware programming time, the number of layers in the network or the number of switches to be programmed, and the total number of flows in the system. Moreover, IGMP does not have provide a security mechanism on behalf of either the flow sender or the flow receiver. As such, anyone in the system is able to initiate a flow, which potentially leads to oversubscription in the network and impacts the media production. Similarly, any device in an IP system is able to submit an IGMP join request to start receiving these flows, which potentially enables malicious devices to disrupt the system or steal unauthorized media content.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
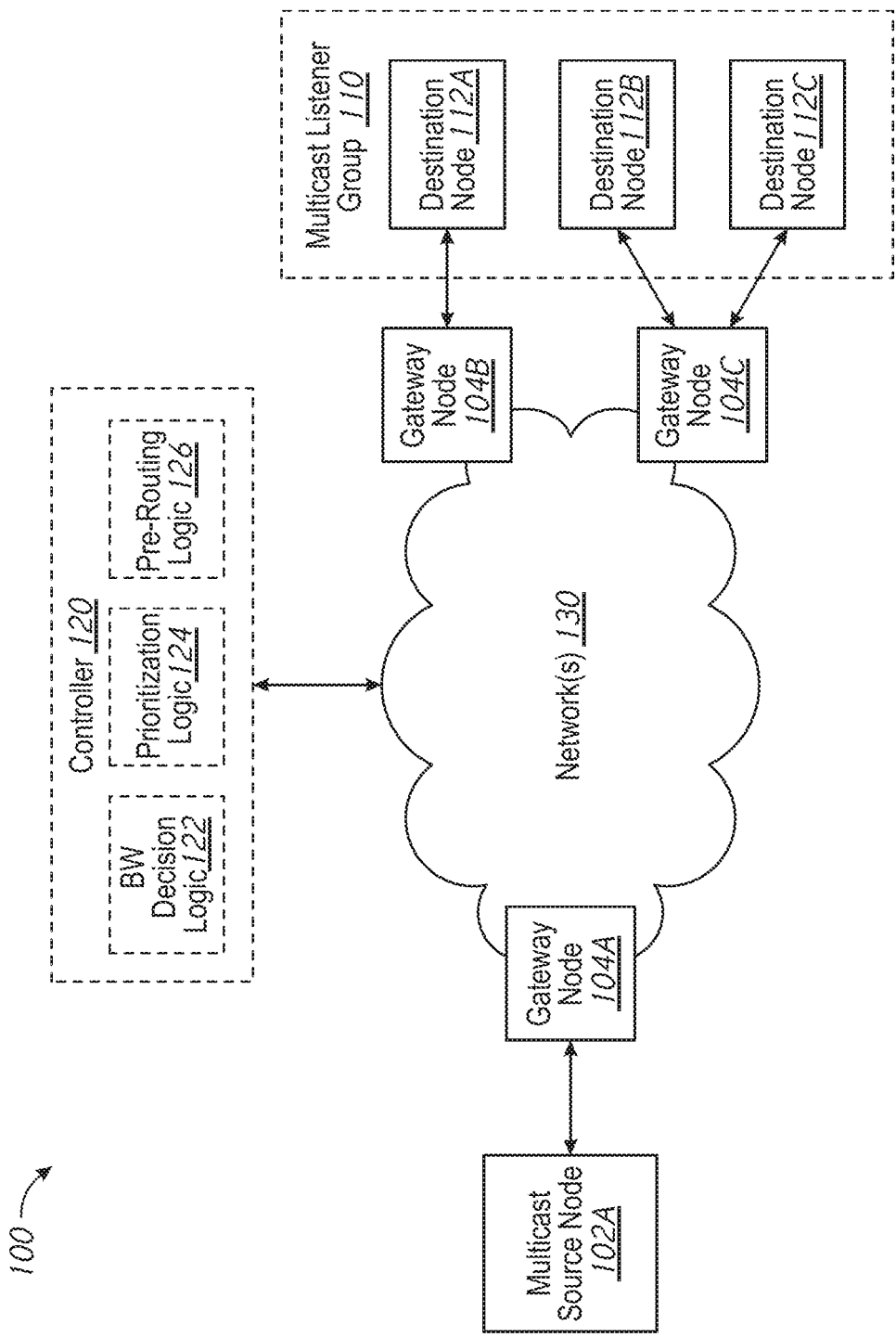
FIG. 1 is a block diagram of an example multicast network environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for reducing the latency related to joining a multicast flow. For example, in some implementations, a method includes: determining a first node as a current termination node of a first multicast flow; determining whether a link between the first node and a downstream next-hop node has available bandwidth to accommodate the first multicast flow, where the downstream next-hop node is not currently associated with the first multicast flow; and transmitting the first multicast flow to the downstream next-hop node according to a determination that the link between the first node and a downstream next-hop node has available bandwidth to accommodate the first multicast flow. According to some implementations, the method is performed by a controller with one or more processors and non-transitory memory, where the controller is communicatively coupled to a plurality of network nodes in a network.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Example Embodiments

The host-driven nature of the Internet Group Management Protocol (IGMP) for multicast Internet Protocol (IP) flows causes intolerable latency for certain workflows such as live broadcast production and distribution. According to some implementations, the various implementations disclosed herein reduce the number of hops to route a multicast flow to the destination, which in turn reduces the IGMP join latency. This reduction in the number of hops is accomplished by pre-routing multicast flows towards downstream edge(s) and holding the multicast flows there until requested by a destination. According to some implementations, the pre-routing of a flow is accomplished amongst the nodes (e.g., switches, routers, and/or the like) of a network in parallel in order to further reduce overall setup time. This reduces the typical processing associated with routing the multicast flow from the source to the destination and significantly reduces the IGMP join latency. Moreover, multiple IGMP join requests can be processed in parallel to further reduce IGMP join latency in large systems.

In essence, this solution provides a mechanism to hold multicast flows at the downstream edge so that the multicast flows can be transmitted to destinations with very short latency. According to some implementations, this solution can be leveraged to reduce the response time to IGMP join requests. This reduced latency is due to the fact that the multicast flow is already available at or near the edge which adds little to no multicast routing activity. Furthermore, unused, less used, and/or low priority flows can be evicted from the edge or held further upstream from the edge to reduce the associated bandwidth burden.

As one example, a video switcher used for live broadcast production would benefit from reduced response times to IGMP requests. For example, the industry standard for latency in live broadcast production is between 1 and 5 milliseconds, which is supported by existing serial-to-digital interface (SDI) systems. A small number of flows (e.g., 10 to 20 flows on average) are used by the video switcher at any given time out of hundreds of potential flows present in the system. Currently, the video switcher receives all the flows in the system (e.g., 100 to 200 flows), which uses a great number of network interfaces and consumes a significant amount of bandwidth. This drastically reduces the scale that the video switcher can support. Furthermore, a great number of SDI to IP gateways are deployed. As a result, hardware, software, and bandwidth costs are high due to the inability of the IP network to provide flows with low latency as a result of the current response time to IGMP requests.

In the case of live broadcast production, for example, this solution holds multicast flows in the network switch as opposed to holding the flows in the video switcher, as is the case today. Instead, with this solution, multicast flows can be delivered to the video switcher on demand. This means that the video switcher can be significantly slimmer, have far fewer network interfaces, and far less bandwidth to operate. For example, instead of 120 network interfaces and ~360 Gbps bandwidth capacity (e.g., 120 high definition (HD) video flows with 3 Gbps per HD video flow) at the video switcher, the number of network interfaces at the video switcher may be reduced to 20 with a bandwidth capacity of ~60 Gbps (e.g., (e.g., 20 HD video flows with 3 Gbps per HD video flow). As such, in the case of live broadcast production, this solution saves bandwidth, cabling, and slims down the video switcher.

FIG. 1 is a block diagram of an example multicast network environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the multicast network environment 100 includes a multicast source node 102A, a multicast listener group 110, a controller 120, and one or more networks 130. According to some implementations, the one or more networks 130 correspond to one or more portions of the public Internet, one or more local area networks (LANs), one or more wide area networks (WANs), one or more metropolitan area networks (MANs), one or more personal area networks (PANs), and/or the like.

In accordance with some implementations, the multicast source node 102A is communicatively coupled with the one or more networks 130 via a gateway node 104A. For example, the multicast source node 102A corresponds to a content server device or the like. Similarly, in accordance with some implementations, destination node 112A is communicatively coupled with the one or more networks 130 via a gateway node 104B, and destination nodes 112B and 112C are communicatively coupled with the one or more networks 130 via a gateway node 104C. For example, the destination nodes 112A, 112B, and 112C (sometimes collectively referred to herein as the "destination nodes 112") correspond to media recording devices, multi-viewer devices, media editing devices, or content consumption devices such as desktop computers, tablet computers, mobile phones, personal digital assistants (PDAs), wearable computing devices, set-top boxes (STBs), over-the-top (OTT) boxes, home appliances, security systems, Internet of things (IoT) devices, or the like. As such, for example, the destination nodes 112 are client devices associated with end-users. According to some implementations, the gateway nodes 104A, 104B, and 104C (sometimes collectively referred to herein as the "gateway nodes 104") correspond to gateway devices, routers, managed switches, unmanaged switches, hubs, bridges, access points, or a suitable combination thereof.

In accordance with some implementations, the multicast source node 102A provides an IP multicast flow (e.g., a media content stream, an emergency signal, etc.) associated with a multicast IP address to which any number of destination nodes can join or subscribe. According to some implementations, the multicast flow includes a stream of multicast packets transmitted using the user datagram protocol (UDP) or the pragmatic general multicast (PGM) transport protocol. As one example, in FIG. 1, a multicast listener group 110, including destination nodes 112A, 112B, and 112C, subscribes to the IP multicast flow provided by the multicast source node 102A. According to some implementations, those of ordinary skill in the art will appreciate from the present disclosure that the multicast listener group 110 includes an arbitrary number of destination nodes 112.

For example, the destination node 112A subscribes to the IP multicast flow provided by the multicast source node 102A by transmitting an IGMP join request (e.g., for IPv4 networks) or a Multicast Listener Discovery (MLD) request (e.g., for IPv6 networks) to the gateway node 104B specifying the multicast IP address of the IP multicast flow provided by the multicast source node 102A. In turn, the gateway node 104B builds up a multicast distribution tree using a multicast routing protocol, such as the Multicast Source Discovery Protocol (MSDP), Protocol Independent Multicast-Sparse Mode (PIM-SM), or Protocol Independent Multicast-Dense Mode (PIM-DM), to determine the closest node associated with the IP multicast flow and subsequently route/transmit the IP multicast flow to the destination node 112A. See, for example, the description of FIGS. 2A-2D for more detail regarding the IP multicast flow joining/subscription process.

In accordance with some implementations, the controller 120 is configured to reduce the latency experienced by the destination nodes 112 between requesting to join the IP multicast flow and receiving the IP multicast flow. According to some implementations, the controller 120 or one or more components thereof (e.g., the pre-routing logic 126)

pushes or pre-routes IP multicast flows from the multicast source node 102A to the edge of the one or more networks 130 (e.g., the gateway nodes 104B and 104C) prior to the destination nodes 112 joining the IP multicast flow based on bandwidth (BW) decision logic 122 and prioritization logic 124. As such, the latency experienced by the destination nodes 112 between requesting to join the IP multicast flow and receiving the IP multicast flow is reduced because the IP multicast flows are pre-routed closer to the edge. See, for example, the description of FIGS. 3A-3F and 4A-4F for further detail regarding the controller 120 including the BW decision logic 122, the prioritization logic 124, and the pre-routing logic 126.

FIGS. 2A-2G illustrate block diagrams of an example multicast flow 210 traversing an example multicast network 200 in accordance with various implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the multicast network 200 includes multicast (MC) source nodes 202A and 202B (sometimes collectively referred to herein as the "MC source nodes 202"), a network 205 including a plurality of MC nodes 206A, 206B, 206C, 206D, 206E, 206F, 206G, and 206H (sometimes collectively referred to herein as the "MC nodes 206"), and destination (dest) nodes 204A, 204B, 204C, and 204D (sometimes collectively referred to herein as the "destination nodes 204").

According to some implementations, the MC source nodes 202 correspond to any suitable combination of media content production and distribution devices such as content servers, cameras, microphones, video editing devices, and/or the like. According to some implementations, the destination nodes 204 correspond to content consumption devices, media recording devices, multi-viewer devices, media editing devices, and/or the like. According to some implementations, the MC nodes 206 correspond to switches, routers, hubs, servers, and/or the like. According to some implementations, those of ordinary skill in the art will appreciate from the present disclosure that the MC nodes 206 within the network 205 are communicatively coupled via an arbitrary topology and that various other topologies could also be implemented between the MC source nodes 202 and the destination nodes 204.

In some implementations, the MC source nodes 202 correspond to content serving devices or entities such as media servers or media distribution entities. In some implementations, the MC nodes 206 correspond to a multicast capable routers within a core or backbone network. For example, the MC nodes 206 comprise a routed network segment, such as a collapsed backbone or routers, that employ the router-port group management protocol (RGMP). In some implementations, the destination nodes 204 correspond to content consuming devices or entities such as desktop computers, tablet computers, mobile phones, PDAs, wearable computing devices, STBs, OTT boxes, home appliances, security systems, IoT devices, or the like.

Figure 2A:
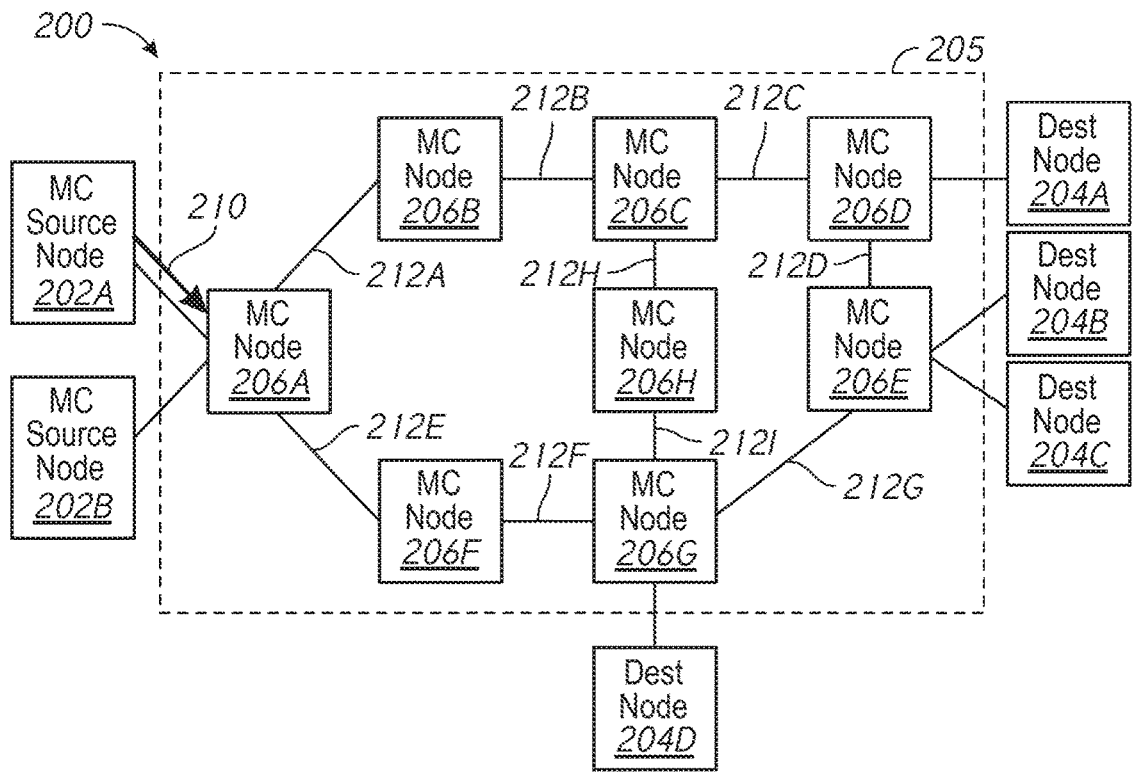
FIGS. 2A-2G illustrate block diagrams of an example multicast flow traversing an example multicast network in accordance with various implementations.

As shown in FIG. 2A, the MC source node 202A initiates a multicast flow 210. For example, the multicast flow 210 is associated with a particular IP address to which listeners are able to join or subscribe. According to some implementations, after instantiation of the multicast flow 210, the multicast flow 210 is transmitted to MC node 206A (e.g., a source edge router or a gateway node associated with the MC source node 202A).

Figure 2B:
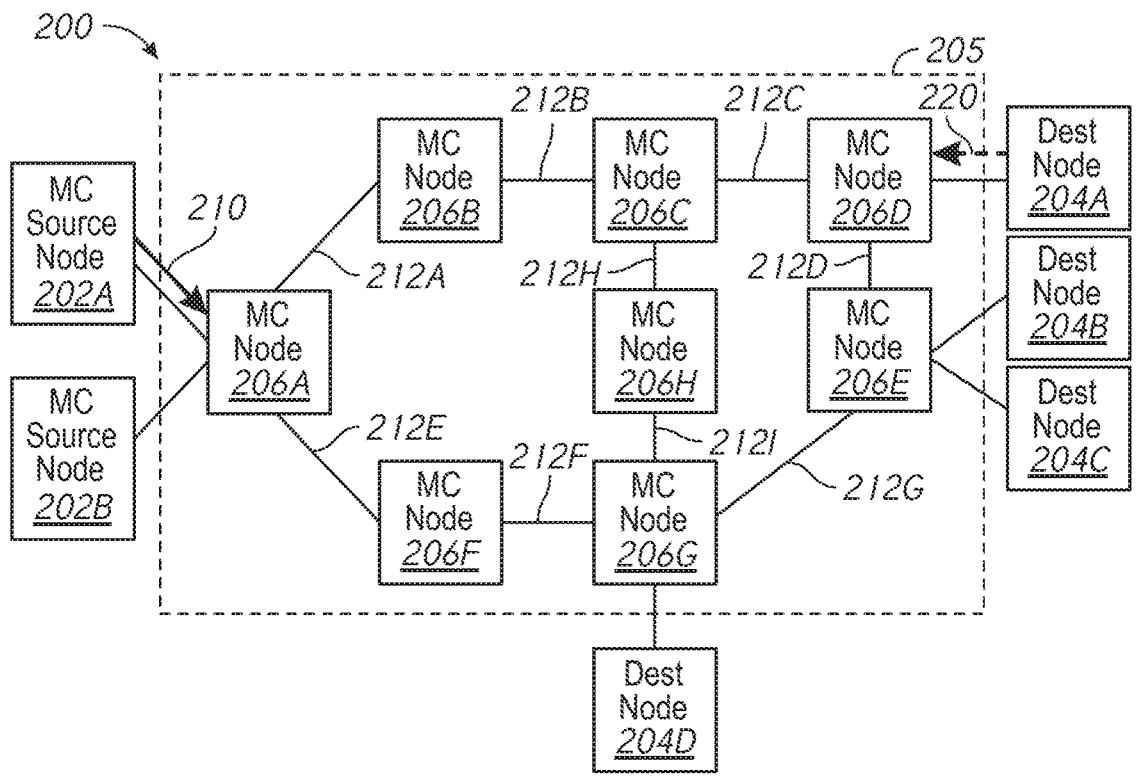

As shown in FIG. 2B, the destination node 204A transmits a join request 220 to MC node 206D (e.g., a source edge router or a gateway node associated with the destination node 204A) to join or subscribe to the multicast flow 210. For example, the join request 220 is an IGMP join request that specifies the IP address associated with the multicast flow 210. In another example, the join request 220 is an MLD join request that specifies the IP address associated with the multicast flow 210.

Figure 2C:
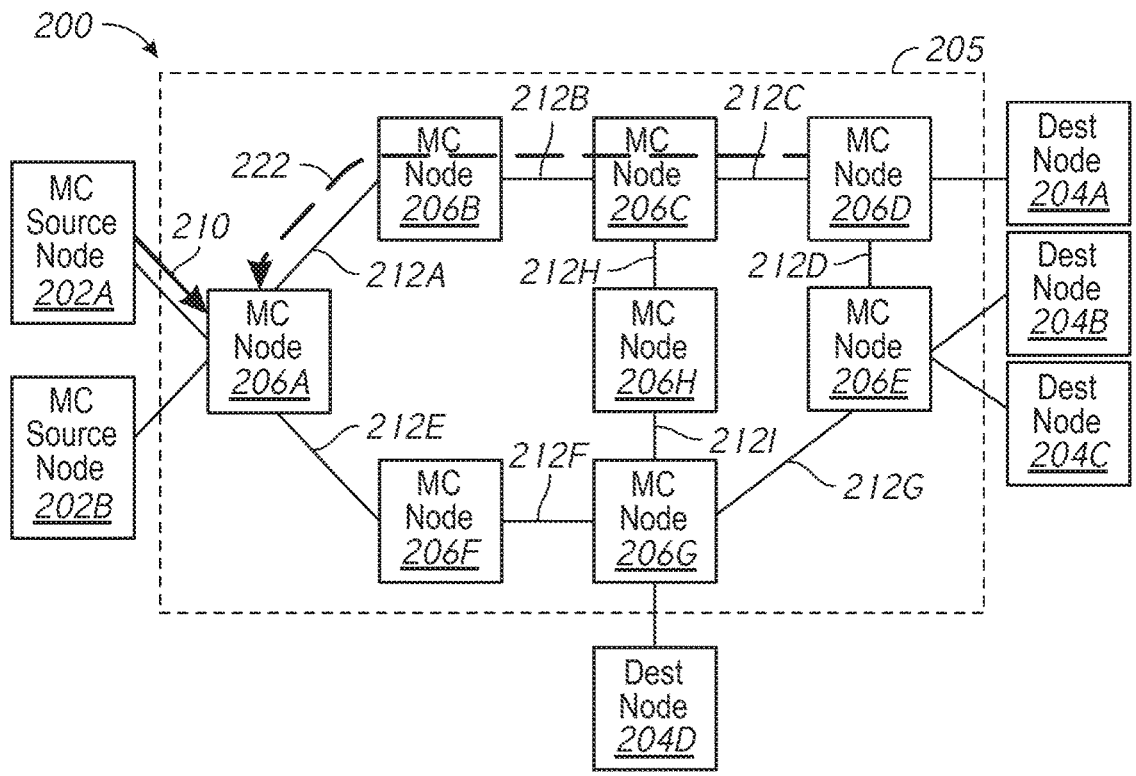

As shown in FIG. 2C, in response to receiving the join request 220, the MC node 206D determines a closest node associated with the multicast flow 210. According to some implementations, the MC nodes 206 use MSDP, PIM-SM, or PIM-DM to build up a multicast distribution tree (e.g., source or shared trees) for the multicast flow 210 that includes a route 222 from the MC node 206D to the closest node associated with the multicast flow 210 (e.g., the MC node 206A). For example, the MC node 206D first determines whether one of its reception (Rx) interfaces is receiving the multicast flow 210, and then the MC node 206D transmits PIM messages to MC nodes 206C and 206E to determine whether one of their Rx interfaces is receiving the multicast flow 210. Continuing with this example, the MC routers continuing transmitting PIM messages to adjacent/linked routers to determine the closest node associated with the multicast flow 210 and to build up a multicast distribution tree in order to route the multicast flow 210 from the MC node 206A to the destination node 204A.

The process of described above is repeated on each of the MC nodes between MC node 206D and MC node 206A and is done serially. For example, the MC node 206D processes the PIM message and then send PIM messages to the MC nodes 206E and 206C. After receiving these messages MC nodes 206E and 206C will process the PIM message, build internal multicast trees and forward them to the nearest MC nodes. As such, processing these PIM messages in serial adds to the amount of time it takes to build the multicast tree across the network 205 and increases overall latency.

Figure 2D:
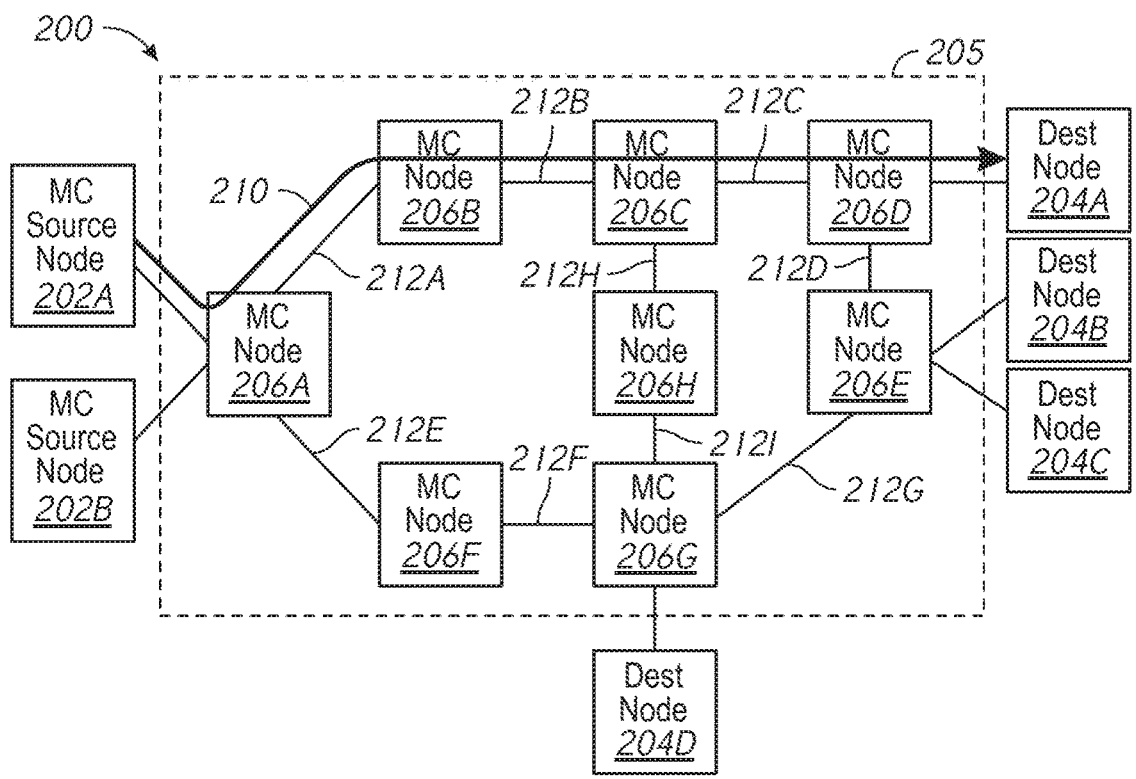

As shown in FIG. 2D, after building the multicast distribution tree for the multicast flow 210, the multicast flow 210 is routed to the destination node 204A. According to some implementations, the multicast flow 210 is routed down the multicast distribution tree using reverse path forwarding (RPF) to ensure a loop free route from the MC node 206A to the destination node 204A. In some implementations, a non-trivial amount of time elapses between the join request 220 in FIG. 2B and the routing of the multicast flow 210 to the destination node 204A in FIG. 2D due to the time involved in building the multicast distribution tree and routing the multicast flow 210 via RPF.

Figure 2E:
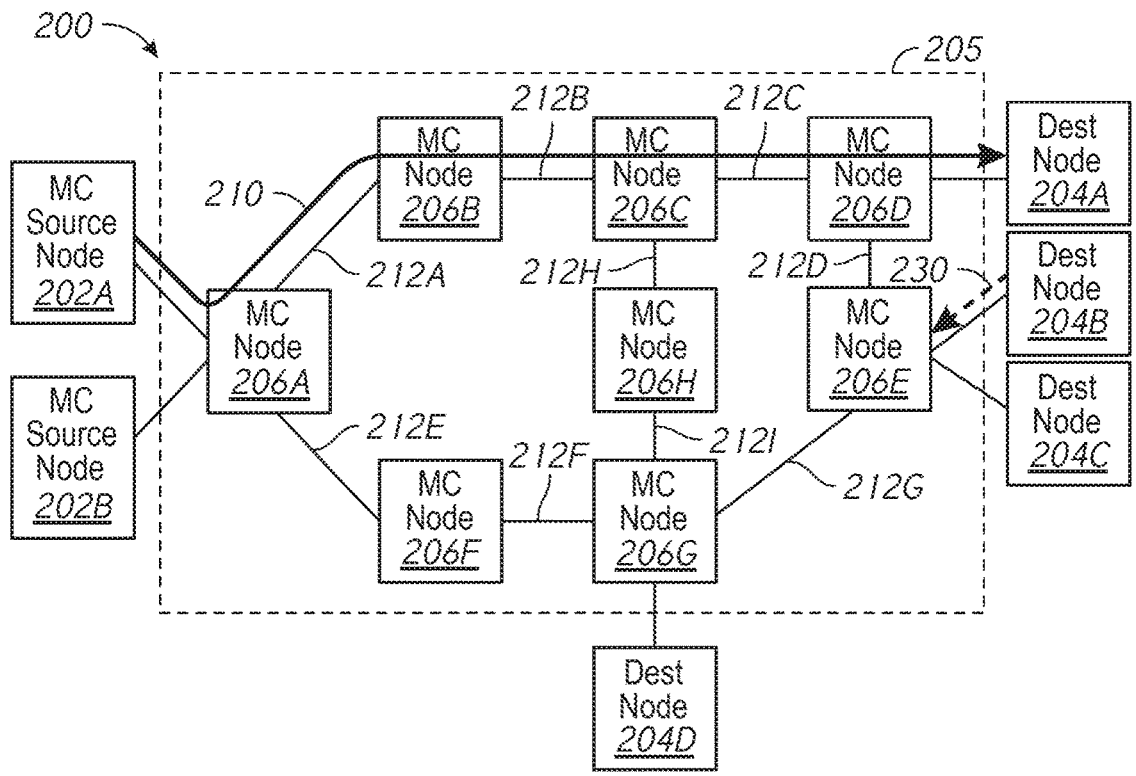

As shown in FIG. 2E, the destination node 204B transmits a join request 230 to MC node 206E (e.g., a source edge router or a gateway node associated with the destination node 204B) to join or subscribe to the multicast flow 210. For example, the join request 230 is an IGMP join request that specifies the IP address associated with the multicast flow 210. In another example, the join request 230 is an MLD join request that specifies the IP address associated with the multicast flow 210.

Figure 2F:
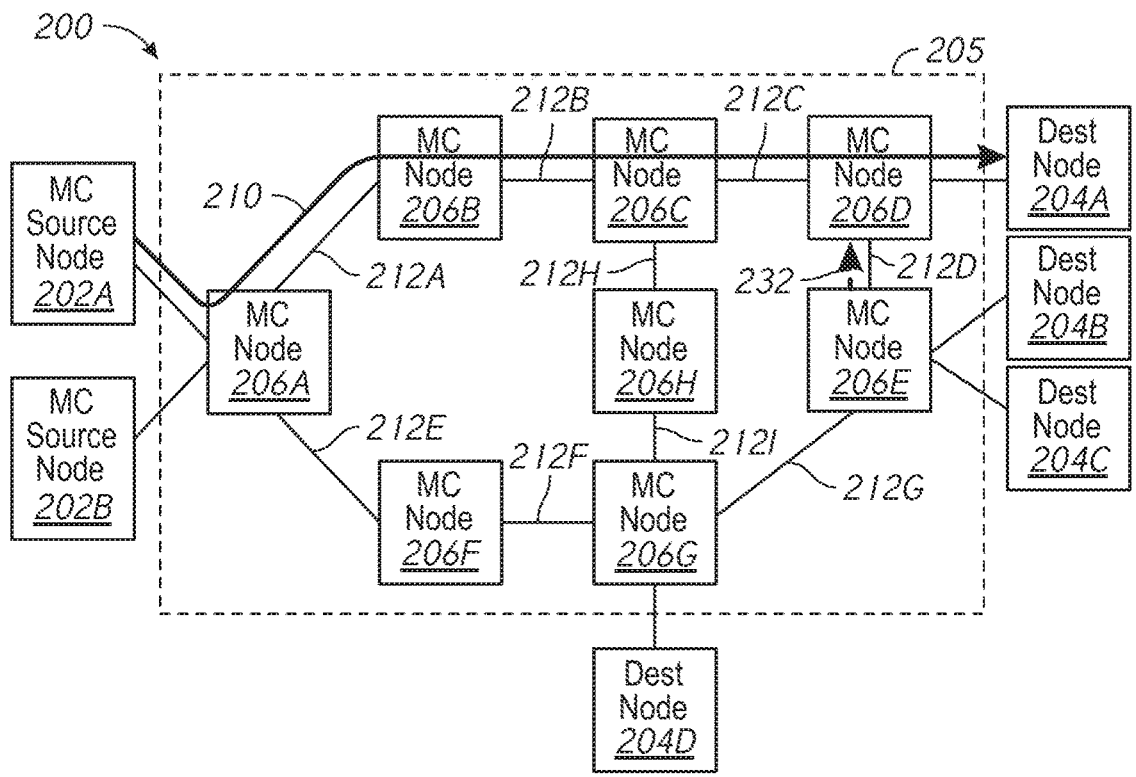

As shown in FIG. 2F, in response to receiving the join request 230, the MC node 206E determines a closest node associated with the multicast flow 210. According to some implementations, the MC nodes 206 use MSDP, PIM-SM, or PIM-DM to build up a multicast distribution tree (e.g., source or shared trees) for the multicast flow 210 that includes a route 232 from the MC node 206E to the closest node associated with the multicast flow 210 (e.g., the MC node 206D).

Figure 2G:
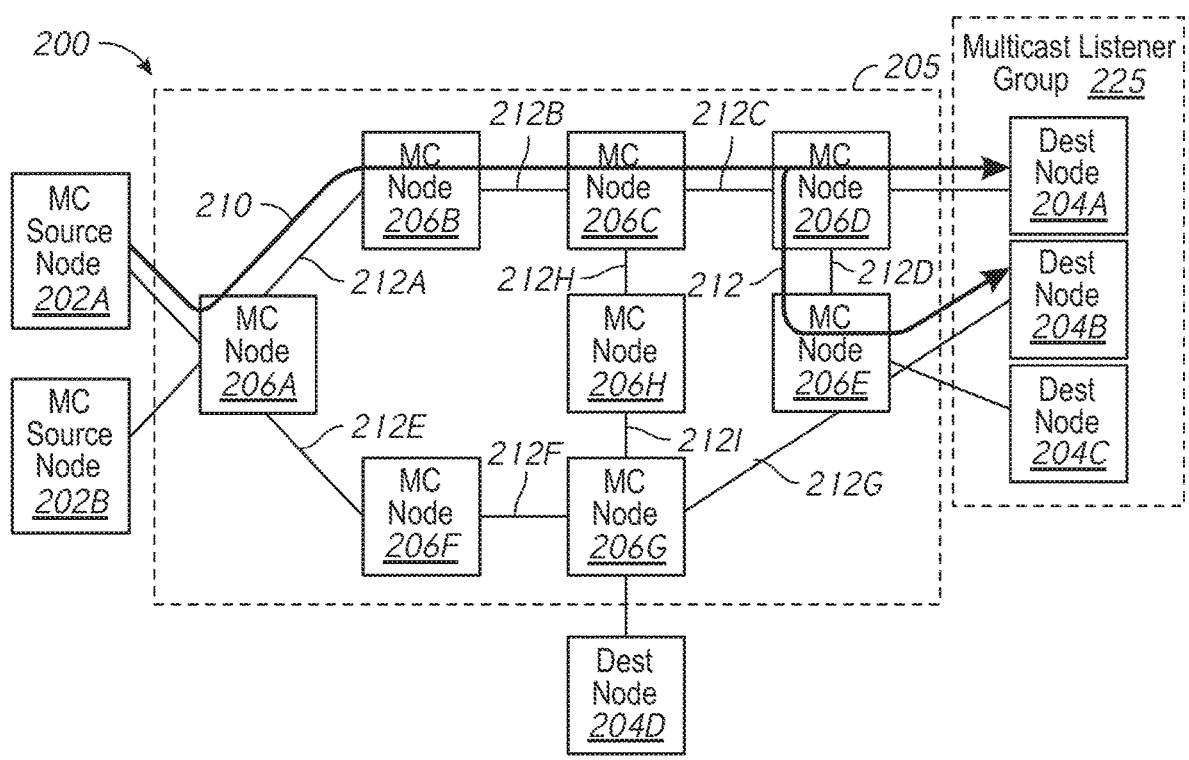

As shown in FIG. 2G, after building the multicast distribution tree for the multicast flow 210 that includes the destination nodes 204A and 204B (e.g., the multicast group 225), the multicast flow 210 is routed to the destination node 204B via the tributary multicast flow 212. According to some implementations, the multicast flow 210 is routed down the multicast distribution tree using RPF to ensure a loop free route from the MC node 206A to the destination nodes 204A and 204B.

FIGS. 3A-3F illustrate block diagrams of an example multicast flow 310 traversing an example improved multicast network 300 in accordance with various implementations. According to some implementations, the improved multicast network 300 is similar to and adapted from the multicast network environment 200 in FIGS. 2A-2G. As such, FIGS. 2A-2G and FIGS. 3A-3F include similar reference numerals and only the differences will be discussed herein for the sake of brevity. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the improved multicast network 300 includes the MC source nodes 202, the network 205 including the plurality of MC nodes 206, the destination nodes 204, and the controller 120.

According to some implementations, the controller 120 is configured to reduce the latency experienced by the destination nodes 204 between requesting to join a respective multicast flow and receiving the respective multicast flow. In some implementations, the controller 120 is separate from and communicatively coupled with the MC nodes 206 within the network 205. In some implementations, the controller 120 is a distributed device implemented amongst the MC nodes 206 within the network 205. In some implementations, the controller 120 includes bandwidth (BW) decision logic 122, prioritization logic 124, and pre-routing logic 126. In some implementations, the BW decision logic 122 is configured to determines whether a link between a current terminal MC router and a downstream next hop MC router has available bandwidth to accommodate a multicast flow. In some implementations, the prioritization logic 124 is configured to determine priority values for two or more multicast flows when a link has sufficient BW to accommodate one of the two or more multicast flows. In some implementations, the pre-routing logic 126 is configured to transmit/route the multicast flow from the current terminal MC router to the downstream next hop MC router based on determinations by the BW decision logic 122 and/or the prioritization logic 124.

Figure 3A:
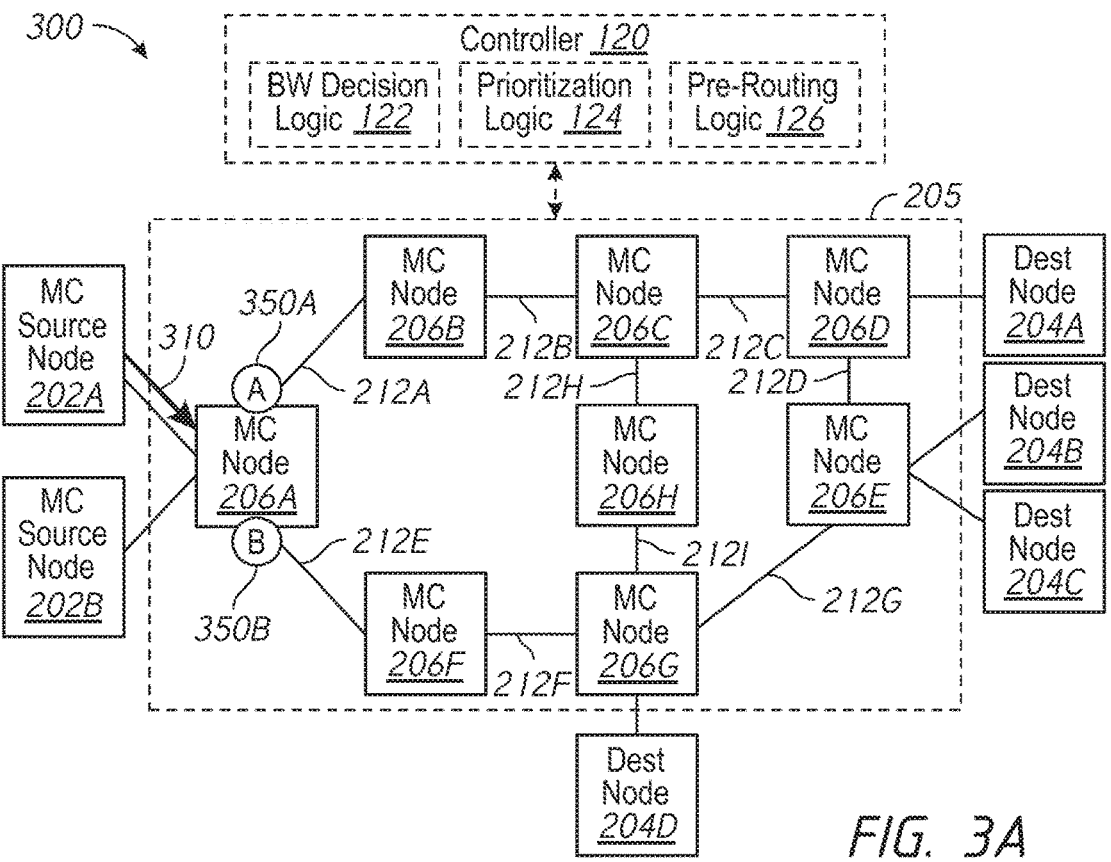
FIGS. 3A-3F illustrate block diagrams of an example multicast flow traversing an example improved multicast network in accordance with various implementations.

As shown in FIG. 3A, the MC source node 202A initiates multicast flow 310. For example, the multicast flow 310 is associated with a particular IP address to which listeners are able to join or subscribe. According to some implementations, after instantiation of the multicast flow 310, the multicast flow 310 is transmitted to MC node 206A (e.g., a source edge router or a gateway node associated with the MC source node 202A).

After the multicast flow 310 is transmitted to the MC node 206A, the controller 120 or one or more components thereof perform determinations 350A and 350B. With reference to determination 350A, the controller 120 or one or more components thereof (e.g., the BW decision logic 122) determine whether link 212A has available BW to accommodate the multicast flow 310. If the link 212A has available BW to accommodate the multicast flow 310, the controller 120 or one or more components thereof (e.g., the pre-routing logic 126) transmit/route the multicast flow 310 to the MC node 206B via a tributary multicast flow (e.g., the tributary multicast flow 312 in FIG. 3B). If the link 212A does not have available BW to accommodate the multicast flow 310, the multicast flow 310 is maintained at the MC node 206A and is not transmitted to the MC node 206B.

With reference to determination 350B, the controller 120 or one or more components thereof (e.g., the BW decision logic 122) determine whether link 212E has available BW to accommodate the multicast flow 310. If the link 212E has available BW to accommodate the multicast flow 310, the controller 120 or one or more components thereof (e.g., the pre-routing logic 126) transmit/route the multicast flow 310 to the MC node 206F via a tributary multicast flow (e.g., the tributary multicast flow 314 in FIG. 3B). If the link 212E does not have available BW to accommodate the multicast flow 310, the multicast flow 310 is maintained at the MC node 206A and is not transmitted to the MC node 206F.

Figure 3B:
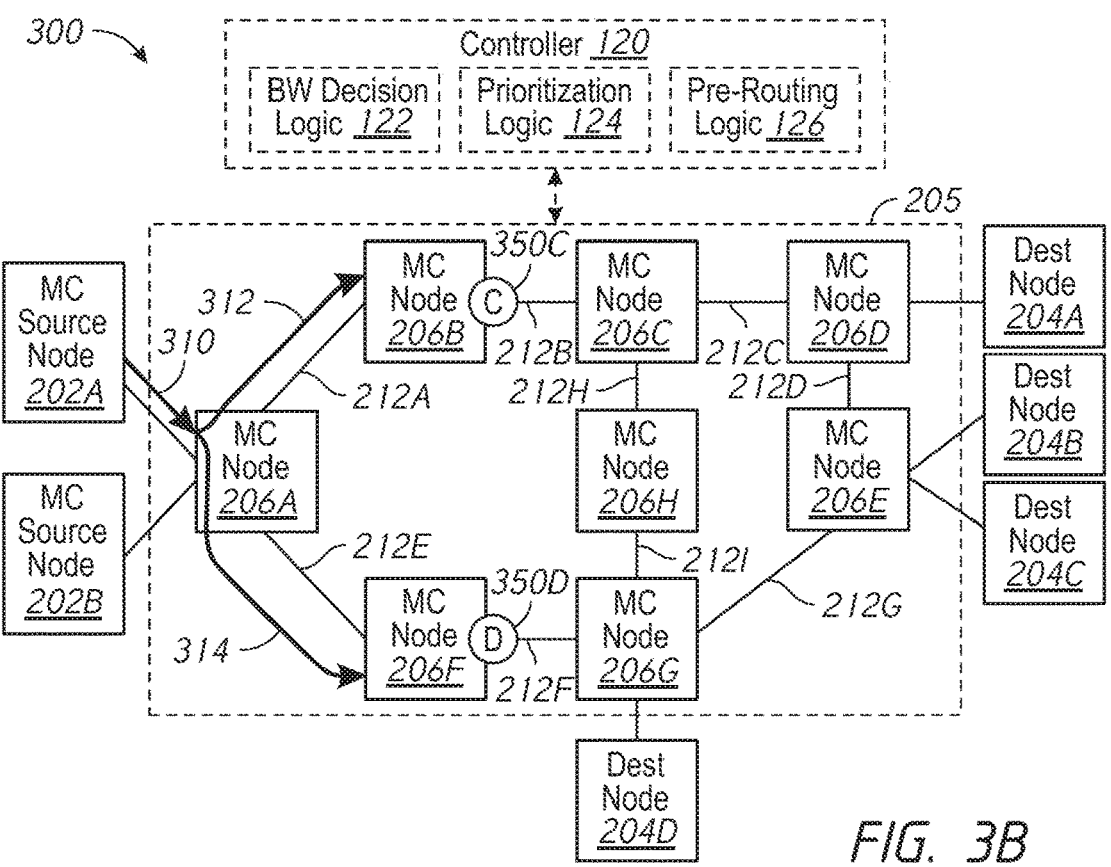

As shown in FIG. 3B, in response to the determination 350A that the link 212A has sufficient available BW to accommodate the multicast flow 310, the controller 120 or one or more components thereof (e.g., the pre-routing logic 126) transmit/route the multicast flow 310 to the MC node 206B via a tributary multicast flow 312. For example, the BW of the link 212A is 100 Gbps, and the current reserved BW associated with the link 212A is 75 Gbps. As such, in this example, the available BW of the link 212A is 25 Gbps. Continuing with this example, the BW of the multicast flow 310 is 10 Gbps. Thus, the link 212A has sufficient BW to accommodate the multicast flow 310 because the available BW of the link 212A is greater than the BW of the multicast flow 310 (e.g., 25 Gbps>10 Gbps). In some implementations, the available BW of a link is reduced by a predefined buffer BW (e.g., 20 Gbps) to account for BW reading inaccuracies, loss, delay, change in current BW demand, emergency BW for high priority flows, and/or the like. Furthermore, as illustrated in FIG. 3B, in response to the determination 350B that the link 212E has sufficient available BW to accommodate the multicast flow 310, the controller 120 or one or more components thereof (e.g., the pre-routing logic 126) transmit/route the multicast flow 310 to the MC node 206F via a tributary multicast flow 314.

After the tributary multicast flow 312 is routed to the MC node 206B, the controller 120 or one or more components thereof perform a determinations 350C to determine whether link 212B has available BW to accommodate the tributary multicast flow 312. If the link 212B has available BW to accommodate the tributary multicast flow 312, the controller 120 or one or more components thereof (e.g., the pre-routing logic 126) transmit/route the tributary multicast flow 312 to the MC node 206C. If the link 212B does not have available BW to accommodate the tributary multicast flow 312, the tributary multicast flow 312 is maintained at the MC node 206B and is not transmitted to the MC node 206C.

Additionally, after the tributary multicast flow 314 is transmitted to the MC node 206F, the controller 120 or one or more components thereof perform a determination 350D to determine whether link 212F has available BW to accommodate the tributary multicast flow 314. If the link 212F has available BW to accommodate the tributary multicast flow 314, the controller 120 or one or more components thereof (e.g., the pre-routing logic 126) transmit/route the tributary multicast flow 314 to the MC node 206G. If the link 212F does not have available BW to accommodate the tributary multicast flow 314, the tributary multicast flow 314 is maintained at the MC node 206F and is not transmitted to the MC node 206G.

Figure 3C:
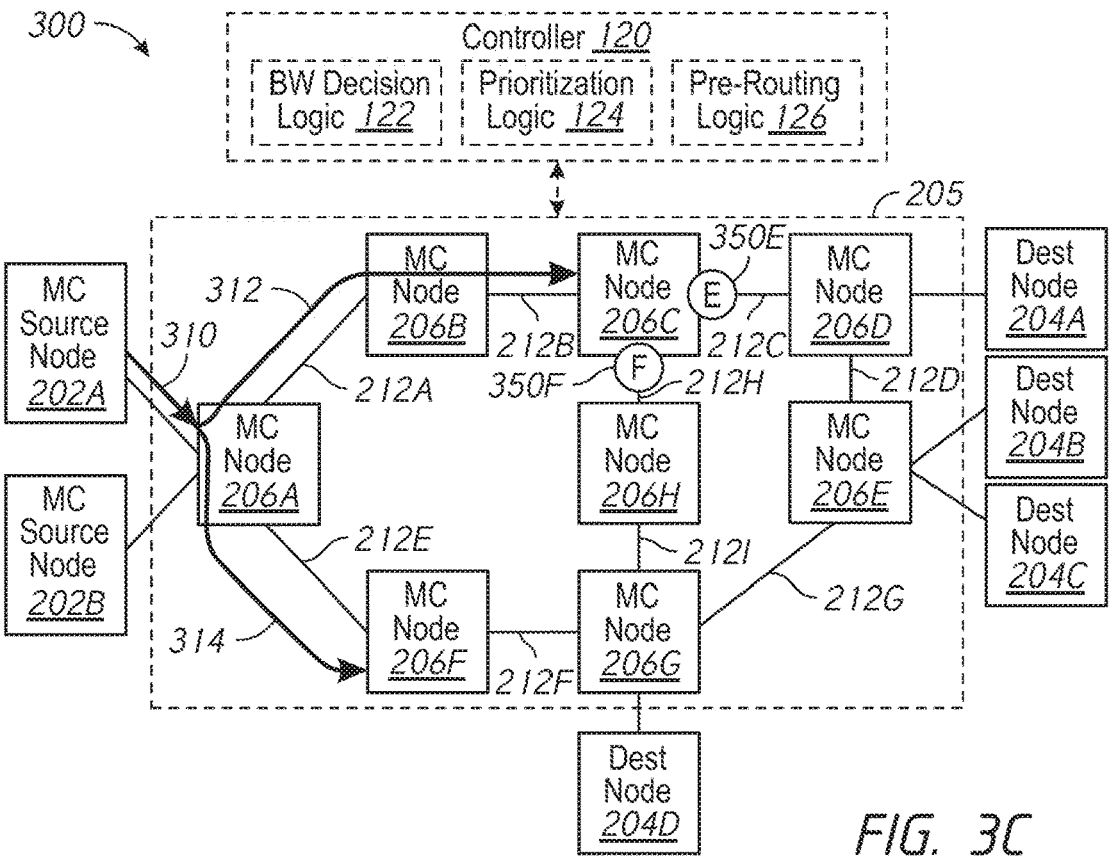

As shown in FIG. 3C, in response to the determination 350C that the link 212B has sufficient available BW to accommodate the tributary multicast flow 312, the controller 120 or one or more components thereof (e.g., the pre-routing logic 126) transmit/route the tributary multicast flow 312 to the MC node 206C. Furthermore, as illustrated in FIG. 3C, in response to the determination 350D that the link 212F has insufficient available BW to accommodate the tributary multicast flow 314, the controller 120 or one or more components thereof (e.g., the pre-routing logic 126) maintain the tributary multicast flow 314 at the MC node 206F.

According to some implementations, after determining that the link 212F has insufficient available BW to accommodate the tributary multicast flow 314, the controller 120 or one or more components thereof (e.g., the prioritization logic 124) determine whether the tributary multicast flow 314 has a higher prioritization value than any other flow that was previously pre-routed to the MC node 206G via the link 212F. If the tributary multicast flow 314 has a higher prioritization value than one or more other flows previously pre-routed to the MC node 206G, the controller 120 or one or more components thereof (e.g., the BW decision logic 122) determines whether the one or more other flows with lower prioritization values are associated with a greater or equal amount of bandwidth as the tributary multicast flow 314. However, if the tributary multicast flow 314 does not have a higher prioritization value than any of the other flows that were previously pre-routed to the MC node 206G, the controller 120 or one or more components thereof (e.g., the pre-routing logic 126) maintain the tributary multicast flow 314 at the MC node 206F.

If the one or more other flows are associated with a greater than or equal amount of bandwidth as the tributary multicast flow 314, the controller 120 or one or more components thereof (e.g., the pre-routing logic 126) evict the one or more other flows from the MC node 206G (e.g., the one or more other flows are no longer pre-routed to the MC node 206G) and route the tributary multicast flow 314 to the MC node 206G. However, if the one or more other flows are associated with a lesser amount of bandwidth as the tributary multicast flow 314, the controller 120 or one or more components thereof (e.g., the pre-routing logic 126) maintain the tributary multicast flow 314 at the MC node 206F.

After the tributary multicast flow 312 is routed to the MC node 206C, the controller 120 or one or more components thereof perform determinations 350E and 350F. With reference to determination 305E, the controller 120 or one or more components thereof (e.g., the BW decision logic 122) determine whether link 212C has BW to accommodate the tributary multicast flow 312. If the link 212A has available BW to accommodate the multicast flow 310, the controller 120 or one or more components thereof (e.g., the pre-routing logic 126) transmit/route the tributary multicast flow 312 to the MC node 206D. If the link 212C does not have available BW to accommodate the tributary multicast flow 312, the tributary multicast flow 312 is maintained at the MC node 206C and is not transmitted to the MC node 206D.

With reference to determination 305F, the controller 120 or one or more components thereof (e.g., the BW decision logic 122) determine whether link 212H has available BW to accommodate the tributary multicast flow 312. If the link 212H has available BW to accommodate the tributary multicast flow 312, the controller 120 or one or more components thereof (e.g., the pre-routing logic 126) transmit/route the tributary multicast flow 312 to the MC node 206H. If the link 212H does not have available BW to accommodate the tributary multicast flow 312, the tributary multicast flow 312 is maintained at the MC node 206C and is not transmitted to the MC node 206H.

Figure 3D:
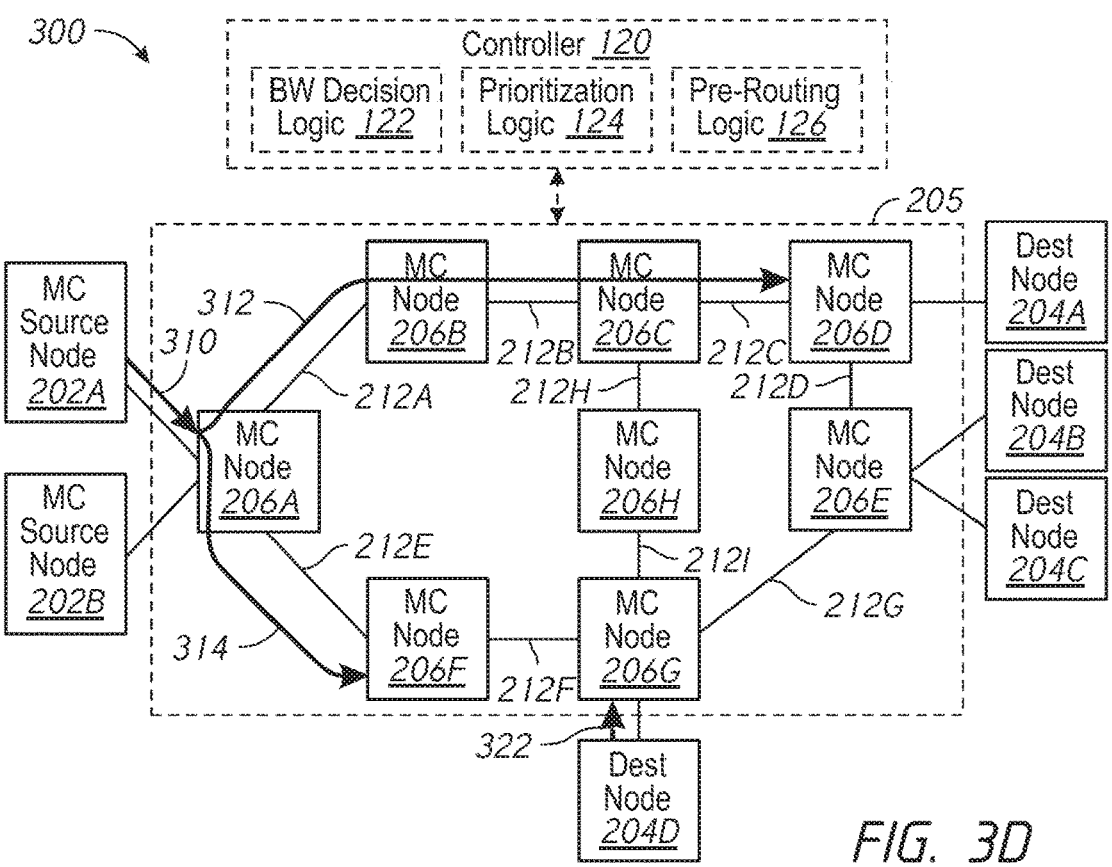

As shown in FIG. 3D, in response to the determination 350C that the link 212C has sufficient available BW to accommodate the tributary multicast flow 312, the controller 120 or one or more components thereof (e.g., the pre-routing logic 126) route the tributary multicast flow 312 to the MC node 206D. Furthermore, as illustrated in FIG. 3D, in response to the determination 350D that the link 212H has insufficient available BW to accommodate the tributary multicast flow 312, the controller 120 or one or more components thereof (e.g., the pre-routing logic 126) do not route the tributary multicast flow 312 to the MC node 206H. In some implementations, the controller 120 or one or more components thereof (e.g., the pre-routing logic 126) cease to pre-route multicast flows once an edge node is reached (e.g., the MC node 206D). In some implementations, once an edge node is reached, the controller 120 or one or more components thereof (e.g., the pre-routing logic 126) pre-route multicast flows to other edge nodes but no further downstream.

For ease of explanation, the determinations 350A, 350B, 350C, 350D, 350E, and 350F are discussed sequentially. However, as will be understood by one of ordinary skill in the art, the pre-routing of the tributary flows 312 and 314 in the network 205 need not happen sequentially in various implementations. According to some implementations, the controller 120 or one or more components thereof (e.g., the BW decision logic 122 and pre-routing logic 126) have complete picture of the network 205 and available BW on the links 212. As such in some implementations, the controller 120 or one or more components thereof determines how far each flow can be pre-routed within the network 205 and issues pre-routing commands to each of the MC nodes 206 in parallel in order to reduce overall setup time.

Furthermore, as shown in FIG. 3D, the destination node 204D transmits a join request 322 to MC node 206G (e.g., a source edge router or a gateway node associated with the destination node 204D) to join or subscribe to the multicast flow 310. For example, the join request 322 is an IGMP join request that specifies the IP address associated with the multicast flow 310. In another example, the join request 322 is an MLD join request that specifies the IP address associated with the multicast flow 310.

According to some implementations, in response to detecting the join request 322, the controller 120 or one or more components thereof determine how far the multicast flow 310 (or the tributary multicast flow 314) is pre-routed within the network 205. In some implementations, the controller 120 or one or more components thereof compute a path from the MC source node 202A to the destination node 204D based on the closest MC node to which the multicast flow 310 is pre-routed (e.g., the MC node 206F). In some implementations, the controller 120 or one or more components thereof evicts pre-routed flows from the MC nodes 206 in the computed path if any of the links in the computed path have insufficient BW to accommodate the multicast flow 310 (or the tributary multicast flow 314). In some implementations, the controller 120 or one or more components thereof send routing requests to the MC nodes 206 in the computed path (e.g., in parallel) to build a multicast distribution tree from the MC source node 202A to the destination node 204D (e.g., a multicast routing tree).

Figure 3E:
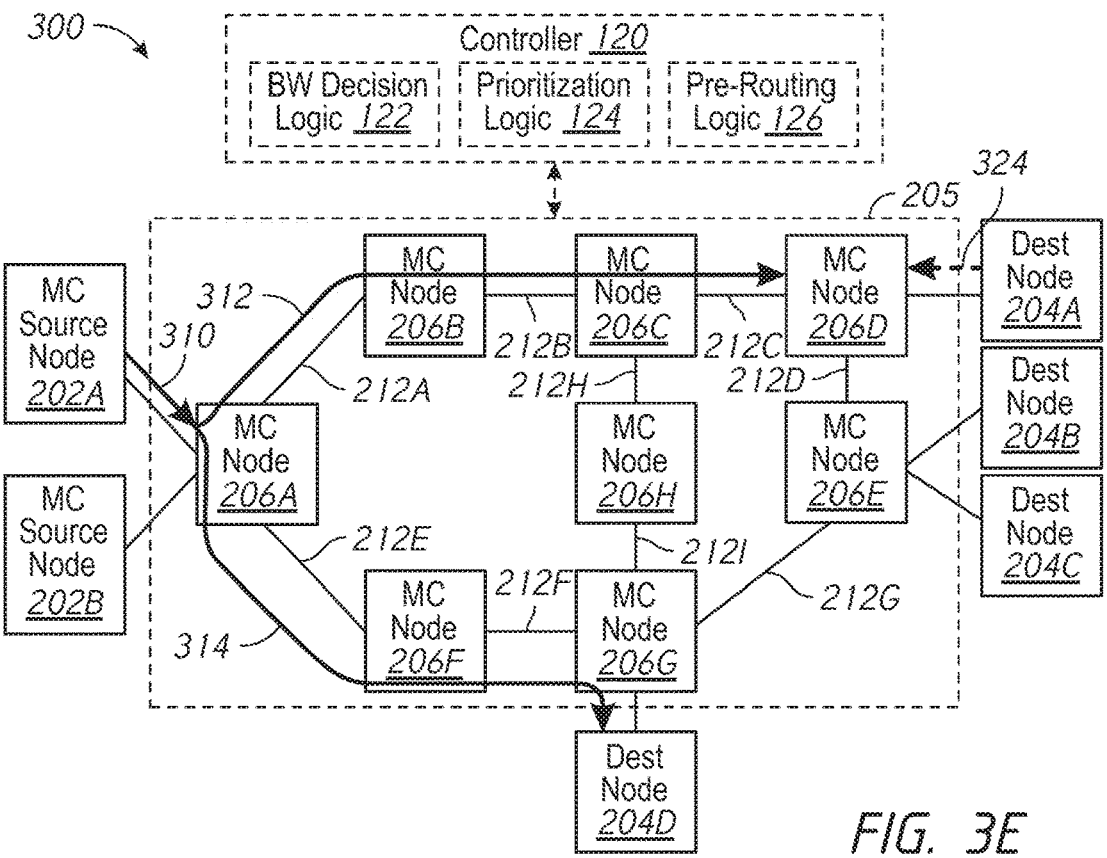

As shown in FIG. 3E, after building the multicast distribution tree for the multicast flow 310 (or the tributary multicast flow 314), the tributary multicast flow 314 is routed from the MC node 206F through the MC node 206G to the destination node 204D. According to some implementations, the multicast flow 310 (or the tributary multicast flow 314) is routed down the multicast distribution tree using reverse path forwarding (RPF) to ensure a loop free route. In some implementations, the amount of time to route the multicast flow 310 to the destination node 204D is less than if the multicast flow 310 were not pre-routed to the MC node 206F. As such, pre-routing the multicast flow 310 via the tributary multicast flow 314 reduces the amount of time between the join request 322 in FIG. 3D and routing of the multicast flow 310 to the destination node 204D in FIG. 3E.

As shown in FIG. 3E, the destination node 204A transmits a join request 324 to MC node 206D (e.g., a source edge router or a gateway node associated with the destination node 204A) to join or subscribe to the multicast flow 310. For example, the join request 324 is an IGMP join request that specifies the IP address associated with the multicast flow 310. In another example, the join request 324 is an MLD join request that specifies the IP address associated with the multicast flow 310.

According to some implementations, in response to detecting the join request 324, the controller 120 or one or more components thereof determine how far the multicast flow 310 (or the tributary multicast flow 312) is pre-routed within the network 205. In some implementations, the controller 120 or one or more components thereof compute a path from the MC source node 202A to the destination node 204A based on the closest MC node to which the multicast flow 310 is pre-routed (e.g., the MC node 206D). In some implementations, the controller 120 or one or more components thereof evicts pre-routed flows from the MC nodes 206 in the computed path if any of the links in the computed path have insufficient BW to accommodate the multicast flow 310 (or the tributary multicast flow 312). In some implementations, the controller 120 or one or more components thereof send routing requests to the MC nodes 206 in the computed path (e.g., in parallel) to build a multicast distribution tree from the MC source node 202A to the destination node 204A (e.g., a multicast routing tree).

Figure 3F:
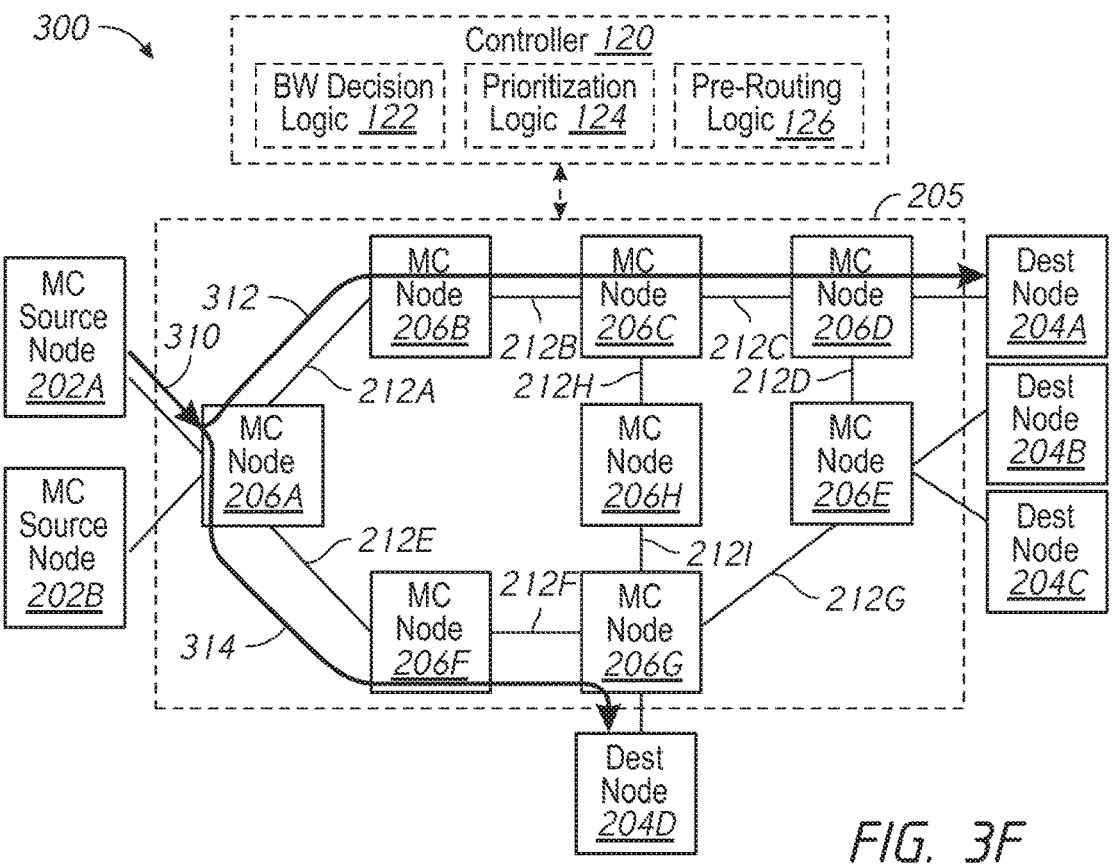

As shown in FIG. 3F, after building the multicast distribution tree for the multicast flow 310 (or the tributary multicast flow 312), the tributary multicast flow 312 is routed from the MC node 206D to the destination node 204A. According to some implementations, the multicast flow 310 (or the tributary multicast flow 312) is routed down the multicast distribution tree using reverse path forwarding (RPF) to ensure a loop free route. In some implementations, the amount of time to route the multicast flow 310 to the destination node 204A is less than if the multicast flow 310 were not pre-routed to the MC node 206D. As such, pre-routing the multicast flow 310 via the tributary multicast flow 312 reduces the amount of time between the join request 324 in FIG. 3E and routing of the multicast flow 310 to the destination node 204A in FIG. 3F.

FIGS. 4A-4F illustrate block diagrams of example multicast flows 410 and 420 traversing the example improved multicast network 300 in accordance with various implementations. According to some implementations, the block diagrams in FIGS. 4A-4F are similar to and adapted from the block diagrams in FIGS. 3A-3F. As such, FIGS. 3A-3F and FIGS. 4A-4F include similar reference numerals and only the differences will be discussed herein for the sake of brevity.

Figure 4A:
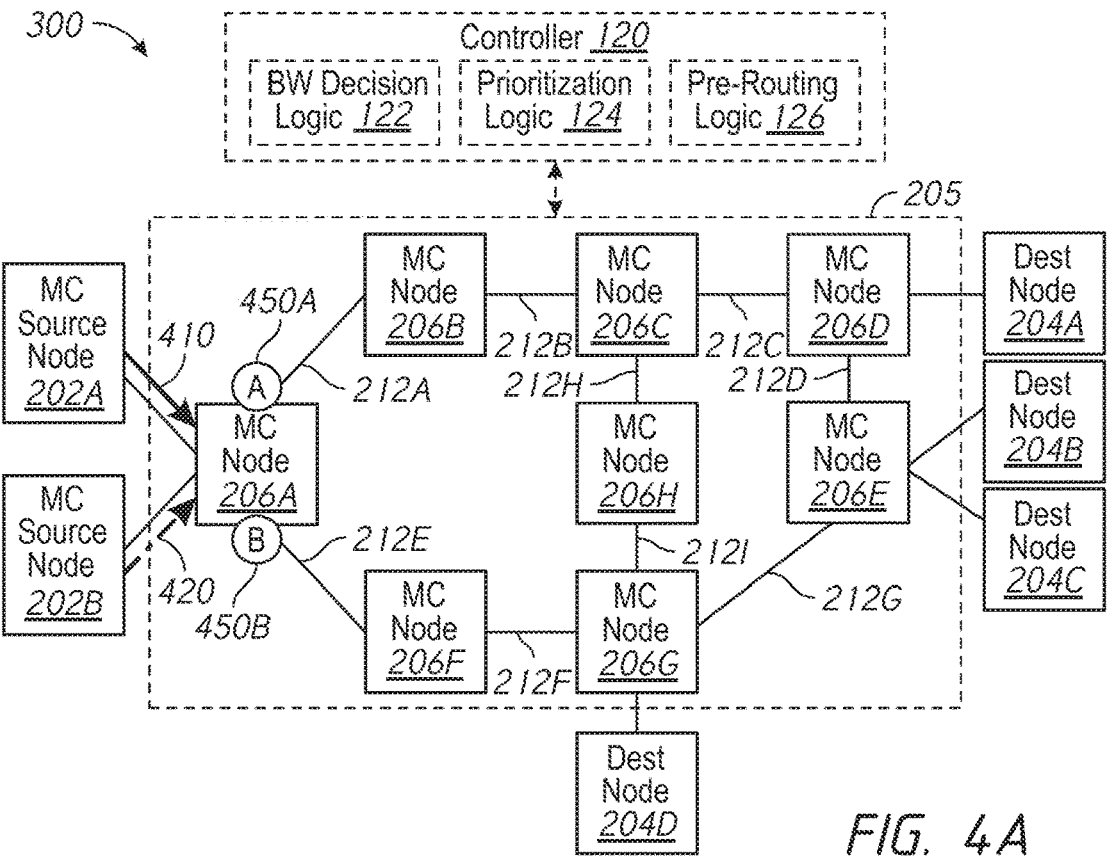
FIGS. 4A-4F illustrate block diagrams of example multicast flows traversing the example improved multicast network in accordance with various implementations.

As shown in FIG. 4A, the MC source node 202A initiates a multicast flow 410. For example, the multicast flow 410 is associated with a first IP address to which listeners are able to join or subscribe. According to some implementations, after instantiation of the multicast flow 410, the multicast flow 410 is transmitted to MC node 206A (e.g., a source edge router or a gateway node associated with the MC source node 202A). Moreover, as shown in FIG. 4A, the MC source node 202B initiates a multicast flow 420. For example, the multicast flow 420 is associated with a second IP address to which listeners are able to join or subscribe. According to some implementations, after instantiation of the multicast flow 420, the multicast flow 420 is transmitted to MC node 206A (e.g., a source edge router or a gateway node associated with the MC source node 202B).

After the multicast flows 410 and 420 are transmitted to the MC node 206A, the controller 120 or one or more components thereof (e.g., the BW decision logic 122) perform determinations 450A and 450B. With reference to determination 450A, the controller 120 or one or more components thereof (e.g., the BW decision logic 122) determine whether link 212A has available bandwidth (BW) to accommodate both of the multicast flows 410 and 420. If the link 212A has available BW to accommodate both of the multicast flows 410 and 420, the controller 120 or one or more components thereof (e.g., the pre-routing logic 126) transmit/route the multicast flows 410 and 420 to the MC node 206B via respective tributary multicast flows (e.g., the tributary multicast flows 412 and 422 in FIG. 4B). If the link 212A does not have available BW to accommodate both of the multicast flows 410 and 420, the controller 120 or one or more components thereof (e.g., the BW decision logic 122) determine whether the link 212A has available BW to accommodate one of the multicast flows 410 or 420. If the link 212A does not have available BW to accommodate either of the multicast flows 410 and 420, the multicast flows 410 and 420 are maintained at the MC node 206A and are not transmitted to the MC node 206B. If the link 212A has available BW for one of the multicast flows 410 or 420, the controller 120 or one or more components thereof (e.g., the prioritization logic 124) determine which of the multicast flows 410 and 420 is associated with a higher prioritization value and transmit/route the higher priority multicast flow to the MC node 206B while maintaining the lower priority multicast flow at the MC node 206A.

For ease of explanation, the determinations 450A, 450B, 450C, 450D, 450E, and 450F are discussed sequentially. However, as will be understood by one of ordinary skill in the art, the pre-routing of the tributary flows 412, 414, 422, and 424 in the network 205 need not happen sequentially in various implementations. According to some implementations, the controller 120 or one or more components thereof (e.g., the BW decision logic 122 and pre-routing logic 126) have complete picture of the network 205 and available BW on the links 212. As such in some implementations, the controller 120 or one or more components thereof determines how far each flow can be pre-routed within the network 205 and issues pre-routing commands to each of the MC nodes 206 in parallel in order to reduce overall setup time.

For example, the BW of the link 212A is 100 Gbps, and the current reserved BW associated with the link 212A is 75 Gbps. As such, in this example, the available BW of the link 212A is 25 Gbps. Continuing with this example, the BW of the multicast flow 410 is 10 Gbps and the BW of the multicast flow 420 is 20 Gbps. Thus, the link 212A has sufficient BW to accommodate either of the multicast flows 410 or 420 but not both of the multicast flows 410 and 420.

In another example, the BW of the link 212A is 100 Gbps, and the current reserved BW associated with the link 212A is 75 Gbps. As such, in this example, the available BW of the link 212A is 25 Gbps. Continuing with this example, the BW of the multicast flow 410 is 30 Gbps and the BW of the multicast flow 420 is 20 Gbps. Thus, the link 212A has sufficient BW to accommodate the multicast flow 420 but not the multicast flow 410.

With reference to determination 450B, the controller 120 or one or more components thereof (e.g., the BW decision logic 122) determine whether link 212E has available BW to accommodate both of the multicast flows 410 and 420. If the link 212E has available BW to accommodate both of the multicast flows 410 and 420, the controller 120 or one or more components thereof (e.g., the pre-routing logic 126) transmit/route the multicast flows 410 and 420 to the MC node 206F via respective tributary multicast flows (e.g., the tributary multicast flows 414 and 424 in FIG. 4B). If the link 212E does not have available BW to accommodate both of the multicast flows 410 and 420, the controller 120 or one or more components thereof (e.g., the BW decision logic 122) determine whether the link 212E has available BW to accommodate one of the multicast flows 410 or 420. If the link 212E does not have available BW to accommodate either of the multicast flows 410 and 420, the multicast flows 410 and 420 are maintained at the MC node 206A and are not transmitted to the MC node 206F. If the link 212E has available BW for one of the multicast flows 410 or 420, the controller 120 or one or more components thereof (e.g., the prioritization logic 124) determine which of the multicast flows 410 and 420 is associated with a higher prioritization value and transmit/route the higher priority multicast flow to the MC node 206F while maintaining the lower priority multicast flow at the MC node 206A.

Figure 4B:
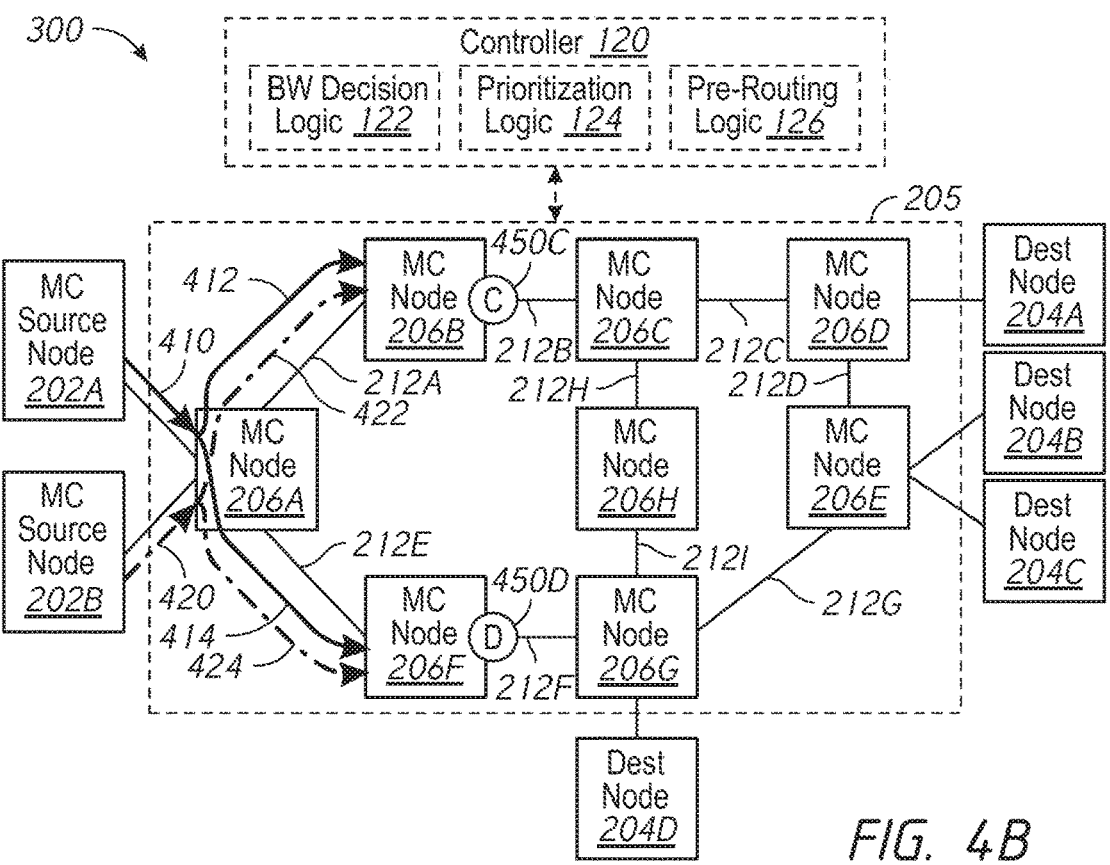

As shown in FIG. 4B, in response to the determination 450A that the link 212A has sufficient available BW to accommodate both of the multicast flows 410 and 420, the controller 120 or one or more components thereof (e.g., the pre-routing logic 126) transmit/route the multicast flows 410 and 420 to the MC node 206B via tributary multicast flows 412 and 422, respectively. Furthermore, as illustrated in FIG. 4B, in response to the determination 450B that the link 212E has sufficient available BW to accommodate both of the multicast flows 410 and 420, the controller 120 or one or more components thereof (e.g., the pre-routing logic 126) transmit/route the multicast flows 410 and 420 to the MC node 206B via tributary multicast flows 414 and 424, respectively. For example, the BW of the link 212E is 100 Gbps, and the current reserved BW associated with the link 212A is 60 Gbps. As such, in this example, the available BW of the link 212E is 40 Gbps. Continuing with this example, the BW of the multicast flow 410 is 10 Gbps and the BW of the multicast flow 420 is 15 Gbps. Thus, the link 212E has sufficient BW to accommodate both of the multicast flows 410 and 420 because the available BW of the link 212E is greater than sum of the BW of the multicast flows 410 and 410 (e.g., 40 Gbps>25 Gbps). In some implementations, the available BW of a link is reduced by a predefined buffer BW (e.g., 10 Gbps) to account for BW reading inaccuracies, loss, delay, change in current BW demand, emergency BW for high priority flows, and/or the like.

After the tributary multicast flows 412 and 422 are routed to the MC node 206B, the controller 120 or one or more components thereof (e.g., the BW decision logic 122) perform a determination 450C to determine whether link 212B has available BW to accommodate both of the tributary multicast flows 412 and 422. If the link 212B has available BW to accommodate both of the tributary multicast flows 412 and 422, the controller 120 or one or more components thereof (e.g., the pre-routing logic 126) transmit/route the tributary multicast flows 412 and 422 to the MC node 206C. If the link 212B does not have available BW to accommodate both of the tributary multicast flows 412 and 422, the controller 120 or one or more components thereof (e.g., the BW decision logic 122) determine whether the link 212B has available BW to accommodate one of the tributary multicast flows 412 and 422. If the link 212B does not have available BW to accommodate either of the tributary multicast flows 412 or 422, the tributary multicast flows 412 and 422 are maintained at the MC node 206B and are not transmitted to the MC node 206C. If the link 212B has available BW for one of the tributary multicast flows 412 or 422, the controller 120 or one or more components thereof (e.g., the prioritization logic 124) determine which of the tributary multicast flows 412 and 422 is associated with a higher prioritization value and transmit/route the higher priority multicast flow to the MC node 206C while maintaining the lower priority multicast flow at the MC node 206B.

After the tributary multicast flows 414 and 424 are routed to the MC node 206F, the controller 120 or one or more components thereof (e.g., the BW decision logic 122) perform a determination 450D to determine whether link 212F has available BW to accommodate both of the tributary multicast flows 412 and 422. If the link 212B has available BW to accommodate both of the tributary multicast flows 414 and 424, the controller 120 or one or more components thereof (e.g., the pre-routing logic 126) transmit/route the tributary multicast flows 414 and 424 to the MC node 206C. If the link 212F does not have available BW to accommodate both of the tributary multicast flows 414 and 424, the controller 120 or one or more components thereof (e.g., the BW decision logic 122) determine whether the link 212F has available BW to accommodate one of the tributary multicast flows 414 and 424. If the link 212B does not have available BW to accommodate either of the tributary multicast flows 414 or 424, the tributary multicast flows 414 and 424 are maintained at the MC node 206F and are not transmitted to the MC node 206G. If the link 212F has available BW for one of the tributary multicast flows 414 or 424, controller 120 or one or more components thereof (e.g., the prioritization logic 124) determine which of the tributary multicast flows 414 and 424 is associated with a higher prioritization value and transmit/route the higher priority multicast flow to the MC node 206G while maintaining the lower priority multicast flow at the MC node 206F.

Figure 4C:
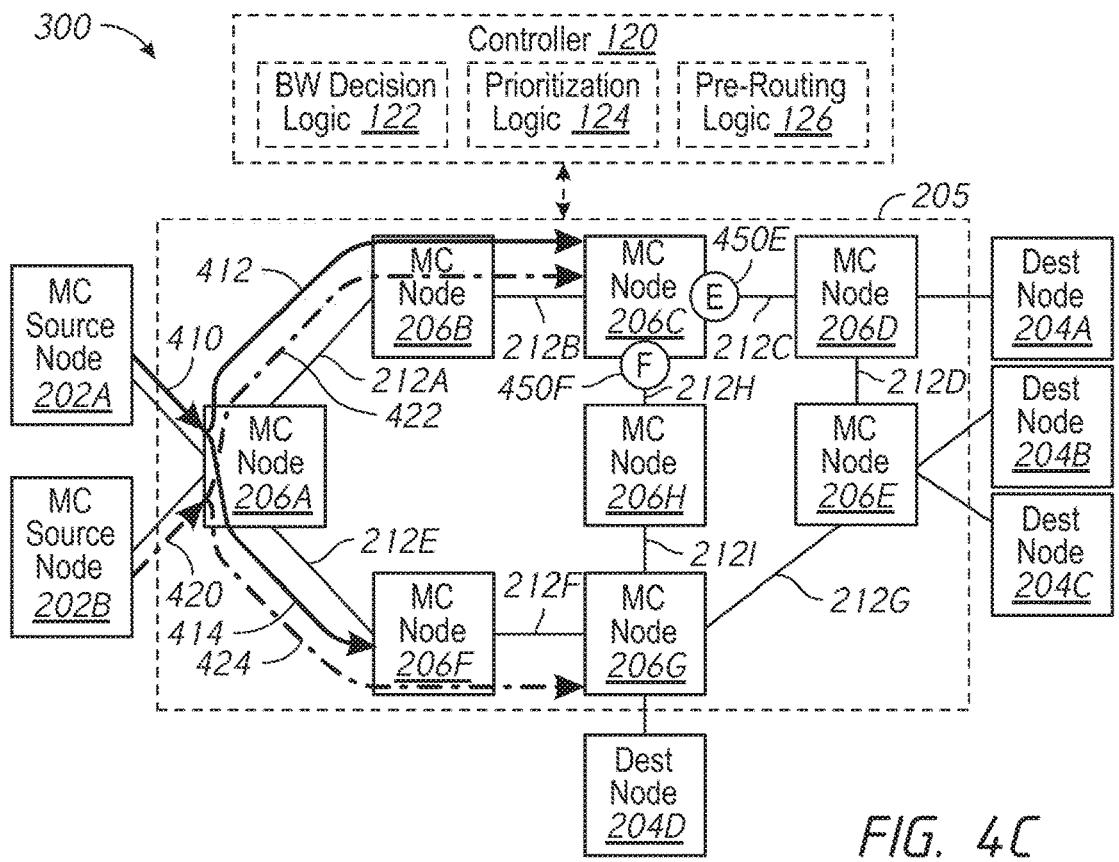

As shown in FIG. 4C, in response to the determination 450C that the link 212B has sufficient available BW to accommodate both of the tributary multicast flows 412 and 422, the controller 120 or one or more components thereof (e.g., the pre-routing logic 126) transmit/route the tributary multicast flows 412 and 422 the MC node 206C. Furthermore, as illustrated in FIG. 4C, in response to the determination 450D that the link 212F has insufficient available BW to accommodate both of the tributary multicast flows 414 and 424 but sufficient available BW to accommodate one of the tributary multicast flows 414 or 424, the controller 120 or one or more components thereof (e.g., the pre-routing logic 126) transmit/route the tributary multicast flow 424 (e.g., the higher priority multicast flow) to the MC node 206G and maintain the tributary multicast flow 414 (e.g., the lower priority multicast flow) at the MC node 206F.

After the tributary multicast flows 412 and 422 are routed to the MC node 206C, the controller 120 or one or more components thereof (e.g., the BW decision logic 122) perform determinations 450E and 450F. With reference to determination 450E, the controller 120 or one or more components thereof (e.g., the BW decision logic 122) determine whether link 212C has available BW to accommodate both of the tributary multicast flows 412 and 422. If the link 212C has available BW to accommodate both of the tributary multicast flows 412 and 422, the controller 120 or one or more components thereof (e.g., the pre-routing logic 126) transmit/route the tributary multicast flows 412 and 422 to the MC node 206D. If the link 212C does not have available BW to accommodate both of the tributary multicast flows 412 and 422, the controller 120 or one or more components thereof (e.g., the BW decision logic 122) determine whether the link 212C has available BW to accommodate one of the tributary multicast flows 412 and 422. If the link 212C does not have available BW to accommodate either of the tributary multicast flows 412 or 422, the tributary multicast flows 412 and 422 are maintained at the MC node 206C and are not transmitted to the MC node 206D. If the link 212C has available BW for one of the tributary multicast flows 412 or 422, the controller 120 or one or more components thereof (e.g., the prioritization logic 124) determine which of the tributary multicast flows 412 and 422 is associated with a higher prioritization value and transmit/route the higher priority multicast flow to the MC node 206C while maintaining the lower priority multicast flow at the MC node 206C.

With reference to determination 450F, the controller 120 or one or more components thereof (e.g., the BW decision logic 122) determine whether link 212H has available BW to accommodate both of the tributary multicast flows 412 and 422. If the link 212H has available BW to accommodate both of the tributary multicast flows 412 and 422, the controller 120 or one or more components thereof (e.g., the pre-routing logic 126) transmit/route the tributary multicast flows 412 and 422 to the MC node 206H. If the link 212H does not have available BW to accommodate both of the tributary multicast flows 412 and 422, the controller 120 or one or more components thereof (e.g., the BW decision logic 122) determine whether the link 212H has available BW to accommodate one of the tributary multicast flows 412 and 422. If the link 212H does not have available BW to accommodate either of the tributary multicast flows 412 or 422, the tributary multicast flows 412 and 422 are maintained at the MC node 206C and are not transmitted to the MC node 206H. If the link 212H has available BW for one of the tributary multicast flows 412 or 422, the controller 120 or one or more components thereof (e.g., the prioritization logic 124) determine which of the tributary multicast flows 412 and 422 is associated with a higher prioritization value and transmit/route the higher priority multicast flow to the MC node 206H while maintaining the lower priority multicast flow at the MC node 206C.

Figure 4D:
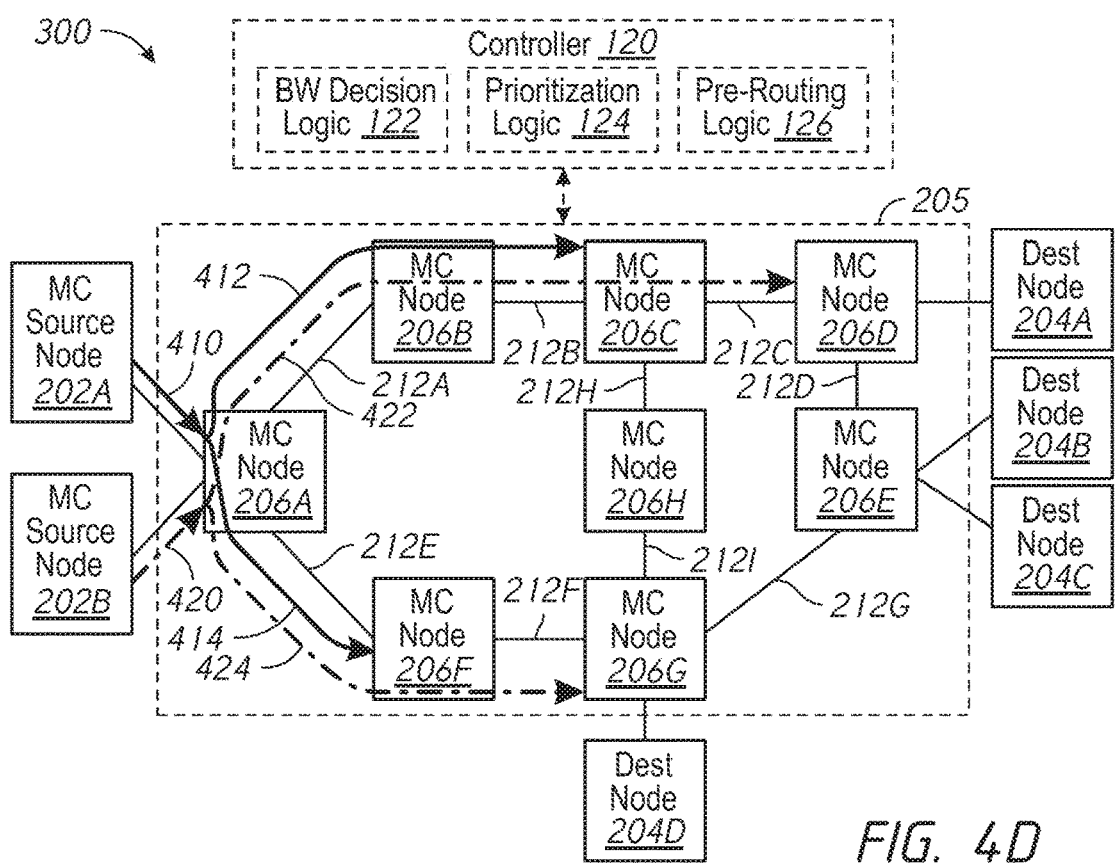

As shown in FIG. 4D, in response to the determination 450E that the link 212C has insufficient available BW to accommodate both of the tributary multicast flows 412 and 422 but sufficient available BW to accommodate one of the tributary multicast flows 412 or 422, the controller 120 or one or more components thereof (e.g., the pre-routing logic 126) transmit/route the tributary multicast flow 422 (e.g., the higher priority multicast flow) to the MC node 206D and maintain the tributary multicast flow 412 (e.g., the lower priority multicast flow) at the MC node 206C. Furthermore, as illustrated in FIG. 4D, in response to the determination 450F that the link 212H has insufficient available BW to accommodate either of the tributary multicast flows 412 or 422, the controller 120 or one or more components thereof (e.g., the pre-routing logic 126) forego transmitting the tributary multicast flows 412 and 422 to the MC node 206H.

Figure 4E:
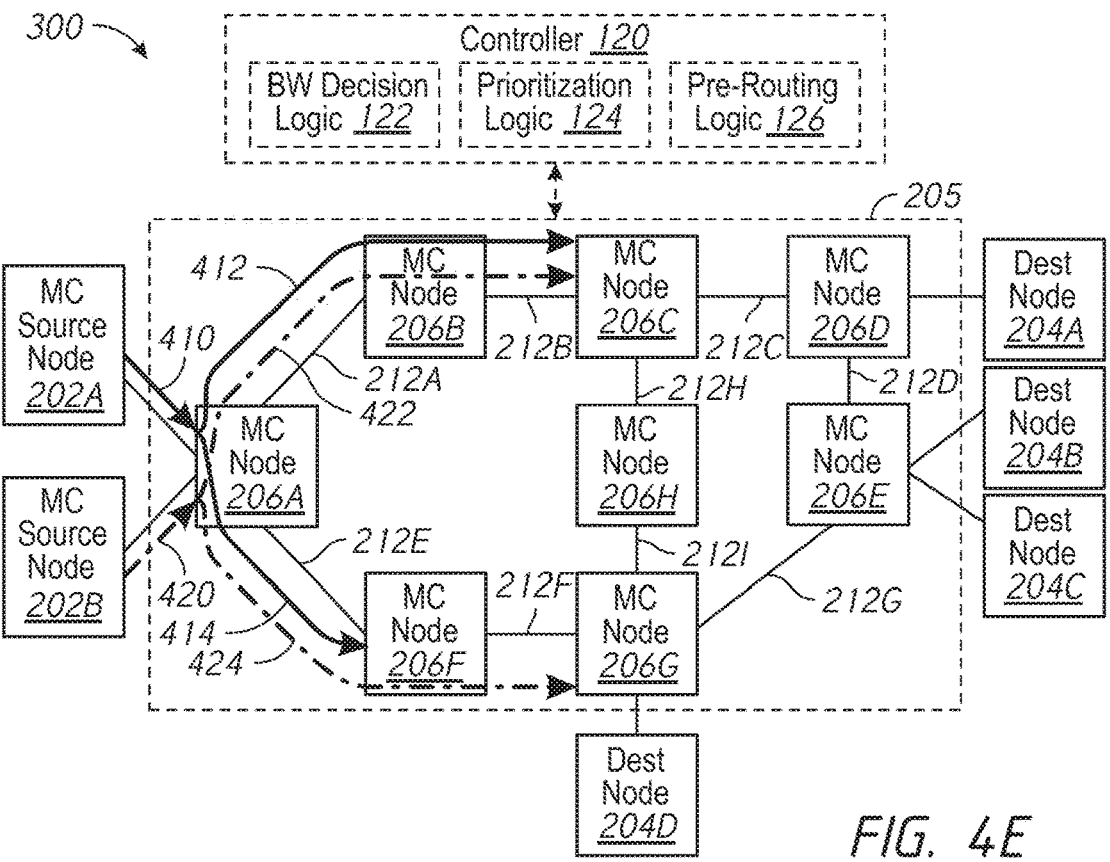

As shown in FIG. 4E, the tributary multicast flow 422 is pruned from the link 212C and is no longer transmitted from the MC node 206C to the MC node 206D. For example, during a next time window, the available BW of the link 212C is insufficient to accommodate the tributary multicast flow 422 due to a change in BW demand (e.g., a new flow or tunnel reserves additional BW on the link 212C).

Figure 4F:
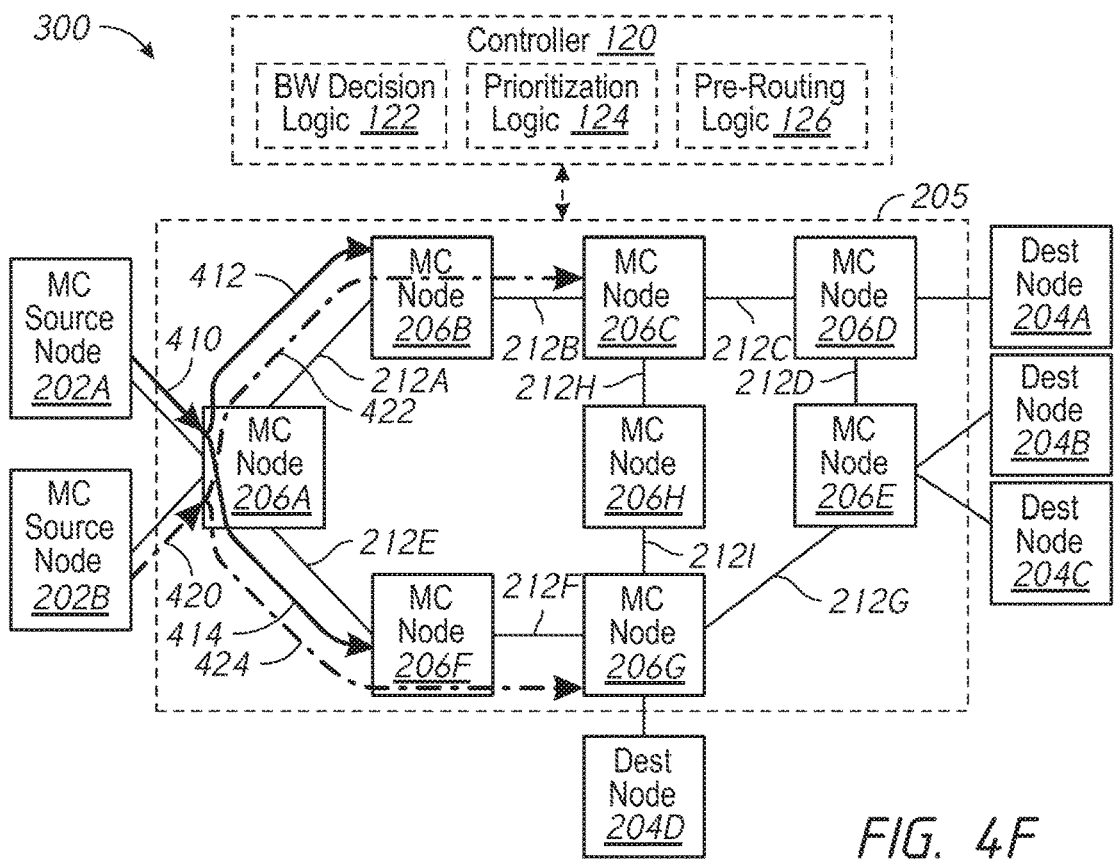

As shown in FIG. 4F, the tributary multicast flow 412 is pruned from the link 212B and is no longer transmitted from the MC node 206B to the MC node 206C. For example, during a next time window, the available BW of the link 212B is insufficient to accommodate both the tributary multicast flows 412 and 422 due to a change in BW demand (e.g., a new flow or tunnel reserves additional BW on the link 212B). However, the link 212B still has available BW to accommodate one of the tributary multicast flows 412 or 422. Therefore, the tributary multicast flow 422 (e.g., the higher priority multicast flow) continues to be transmitted to the MC node 206C, and the tributary multicast flow 412 (e.g., the lower priority multicast flow) ceases to be transmitted to the MC node 206C.

Figure 5:
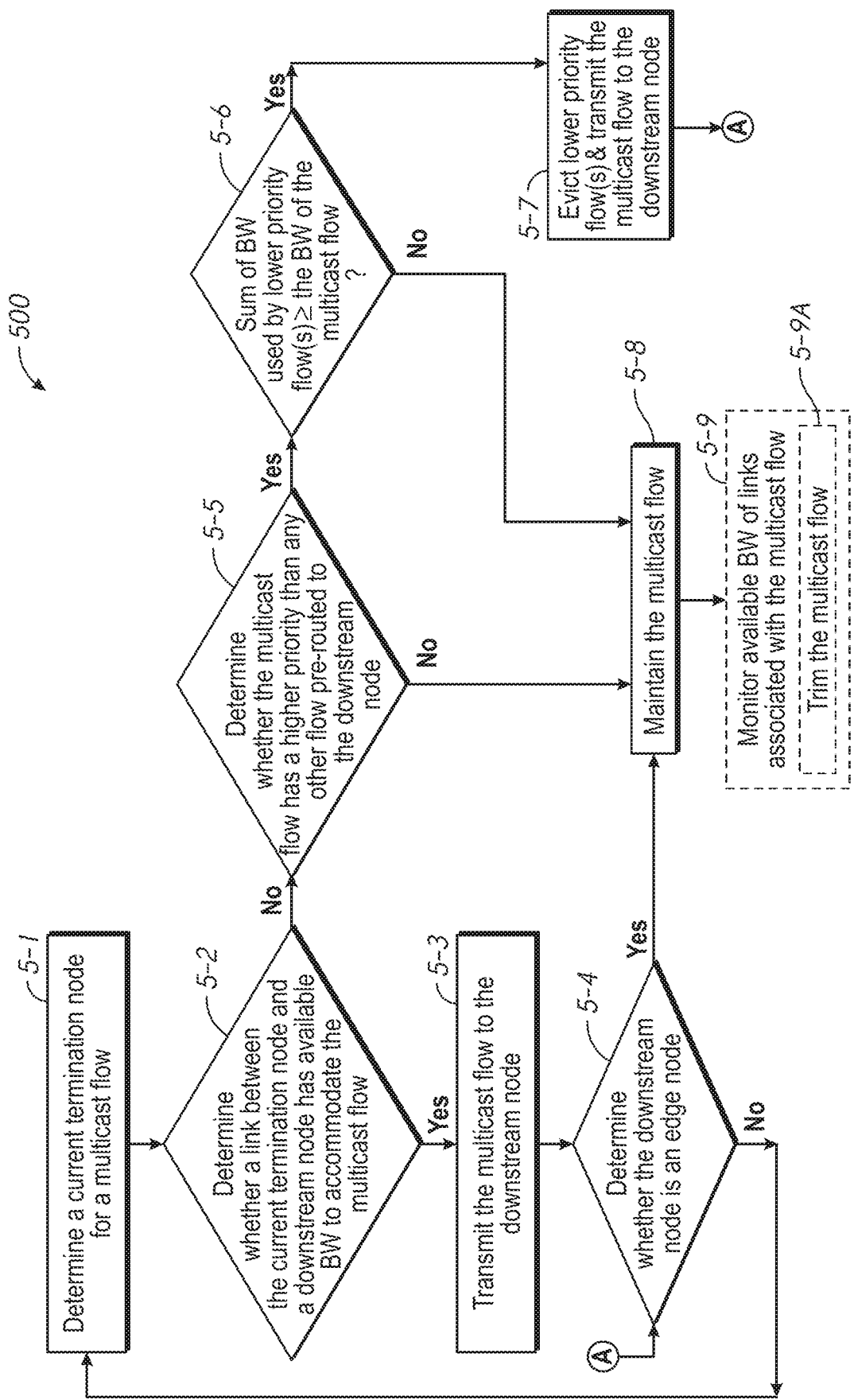
FIG. 5 is a flowchart representation of a method of pre-routing multicast flows within a network to reduce joining latency in accordance with some implementations.

FIG. 5 is a flowchart representation of a method 500 of pre-routing multicast flows within a network to reduce joining latency in accordance with some implementations. In various implementations, the method 500 is performed by a controller (e.g., the controller 120 in FIG. 1, FIGS. 3A-3F, and FIGS. 4A-4F). In some implementations, the method 500 is performed by processing logic, including hardware, firmware, software, or a combination thereof. In some implementations, the method 500 is performed by a processor executing code stored in a non-transitory computer-readable medium (e.g., a memory).

To that end, as represented by block 5-1, the method 500 includes determining a current termination node for a multicast flow. In some implementations, the controller 120 or one or more components thereof determine the current termination node for the multicast flow in response to detecting a trigger event such as instantiation of the multicast flow or reception a command from an application to pre-route multicast flows in order to reduce associated joining latency. For example, with reference to FIG. 3A, the controller 120 or one or more components thereof determine that the MC node 206A is the current termination node of the multi cast flow 310.

As represented by block 5-2, the method 500 includes determining whether a link between the current termination node and a downstream node has BW to accommodate the multicast flow. In some implementations, the controller 120 or one or more components thereof (e.g., the BW decision logic 122) determine whether the link between the current termination node (determined in block 5-1) and the downstream node has sufficient available BW to accommodate the multicast flow. According to some implementations, the downstream node is a downstream next hop node in relation to current termination node. In some implementations, the determination is made with respect to respective links of multiple downstream nodes.

For ease of explanation, the determination at block 5-2 is discussed independent of similar determinations at other downstream nodes. However, as will be understood by one of ordinary skill in the art, the pre-routing of the flow 310 in the network 205 shown in FIG. 3A need not happen sequentially in various implementations. According to some implementations, the controller 120 or one or more components thereof (e.g., the BW decision logic 122 and pre-routing logic 126) have complete picture of the network 205 and available BW on the links 212. As such in some implementations, the controller 120 or one or more components thereof determines how far the flow 310 can be pre-routed within the network 205 and issues pre-routing commands to each of the MC nodes 206 in parallel in order to reduce overall setup time.

For example, with reference to FIG. 3A, the controller 120 or one or more components thereof (e.g., the BW decision logic 122) perform determinations 350A and 350B. With reference to determination 350A, the controller 120 or one or more components thereof (e.g., the BW decision logic 122) determine whether link 212A between the MC node 206A (e.g., the current termination node) and the MC node 206B (e.g., a first downstream next hop node) has available BW to accommodate the multicast flow 310. With reference to determination 350B, the controller 120 or one or more components thereof (e.g., the BW decision logic 122) determine whether link 212E between the MC node 206A (e.g., the current termination node) and the MC node 206F (e.g., a second downstream next hop node) has available BW to accommodate the multicast flow 310.

If the link between the current termination node and the downstream node has insufficient available BW to accommodate the multicast flow ("No" path from block 5-2), the method 500 continues to block 5-5. As such, a portion of the BW of the link is currently reserved, and the available BW of the link is insufficient to accommodate pre-routing of the multicast flow to the downstream node. If the link between the current termination node and the downstream node has sufficient available BW to accommodate the multicast flow ("Yes" path from block 5-2), the method 500 continues to block 5-3. As such, the available BW of the link is sufficient to accommodate pre-routing of the multicast flow to the downstream node.

For example, with reference to FIG. 3A, the BW of the link 212A is 100 Gbps, and the current reserved BW associated with the link 212A is 75 Gbps. As such, in this example, the available BW of the link 212A is 25 Gbps. Continuing with this example, the BW of the multicast flow 310 is 10 Gbps. Thus, the link 212A has sufficient BW to accommodate the multicast flow 310 because the available BW of the link 212A is greater than the BW of the multicast flow 310 (e.g., 25 Gbps>10 Gbps). In some implementations, the available BW of a link is reduced by a predefined buffer BW (e.g., 20 Gbps) to account for BW reading inaccuracies, loss, delay, change in current BW demand, emergency BW for high priority flows, and/or the like.

As represented by block 5-3, the method 500 includes transmitting the multicast flow to the downstream node. In some implementations, the controller 120 or one or more components thereof (e.g., the pre-routing logic 126) transmit/route the multicast flow to the downstream node. For example, with reference to FIGS. 3A-3B, in response to the determination 350A that the link 212A has sufficient available BW to accommodate the multicast flow 310, the controller 120 or one or more components thereof (e.g., the pre-routing logic 126) transmit/route the multicast flow 310 to the MC node 206B via a tributary multicast flow 312. Continuing with this example, with reference to FIGS. 3A-3B, in response to the determination 350B that the link 212E has sufficient available BW to accommodate the multicast flow 310, the controller 120 or one or more components thereof (e.g., the pre-routing logic 126) transmit/route the multicast flow 310 to the MC node 206F via a tributary multicast flow 314.

As represented by block 5-4, the method 500 includes determining whether the downstream node is an edge node. In some implementations, the controller 120 or one or more components thereof determine whether the downstream node is an edge node. For example, with reference to FIGS. 3A-3F, the MC nodes 206D, 206E, and 206G correspond to edge nodes of the network 205. For example, an edge node is gateway node to an end-user node/device. In another example, an edge node is associated with the edge of the core network, and the edge node is communicatively coupled with a gateway node to an end-user node/device.

If the downstream node is the edge node ("Yes" path from block 5-4), the method 500 continues to block 5-8. As such, the controller 120 has pre-routed the multicast flow to the edge of the core network. According to some embodiment, the controller 120 ceases to pre-route the multicast flow once the multicast flow reaches an edge node. If the downstream node is not the edge node ("No" path from block 5-4), the method 500 continues to block 5-1. As such, the controller 120 has pre-routed the multicast flow to a non-edge node of the core network. According to some embodiment, the controller 120 continues to pre-route the multicast flow until the multicast flow reaches an edge node.

As represented by block 5-5, the method 500 includes determining whether the multicast flow has a higher priority than any other flow pre-routed to the downstream node. For example, with reference to FIG. 3C, after determining that the link 212F has insufficient available BW to accommodate the tributary multicast flow 314, the controller 120 or one or more components thereof (e.g., the prioritization logic 124) determine whether the tributary multicast flow 314 has a higher prioritization value than any other flow that was previously pre-routed to the MC node 206G via the link 212F.

If the multicast flow has a higher priority than at least one other flow pre-routed to the downstream node ("Yes" path from block 5-5), the method 500 continues to block 5-6. If the multicast flow is not higher priority than at least one other flow pre-routed to the downstream node ("No" path from block 5-5), the method 500 continues to block 5-8.

As represented by block 5-6, the method 500 includes determining whether the sum of the bandwidth (BW) used by lower priority flow(s) is greater than or equal to the BW of the multicast flow. For example, with reference to FIG. 3C, after determining that the tributary multicast flow 314 has a higher prioritization value than one or more other flows previously pre-routed to the MC node 206G, the controller 120 or one or more components thereof (e.g., the BW decision logic 122) determines whether the one or more other flows with lower prioritization values are associated with a greater or equal amount of bandwidth as the tributary multicast flow 314.

If the sum of the BW used by the lower priority flow(s) is greater than or equal to the BW of the multicast flow ("Yes" path from block 5-6), the method 500 continues to block 5-7. If the sum of the BW used by the lower priority flow(s) is less than the BW of the multicast flow ("No" path from block 5-6), the method 500 continues to block 5-8.

As represented by block 5-7, the method 500 includes evicting at least some the lower priority flow(s) and transmitting the multicast flow to the downstream node. For example, with reference to FIG. 3C, after determining that the one or more other flows are associated with a greater than or equal amount of bandwidth as the tributary multicast flow 314, the controller 120 or one or more components thereof (e.g., the pre-routing logic 126) evicts at least some the one or more other flows from the MC node 206G (e.g., the one or more other flows are no longer pre-routed to the MC node 206G) and routes the tributary multicast flow 314 to the MC node 206G. For example, the controller 120 evicts the lowest priority flow(s) for which the sum of their associated BW is greater than or equal the BW associated with the multicast flow.

As represented by block 5-8, the method 500 includes maintaining the multicast flow at its current terminal node (e.g., the current termination node determined in block 5-1 or the downstream node to which the multicast flow was transmitted to in blocks 5-3 or 5-7). In some implementations, the controller 120 or one or more components thereof maintain the multicast flow at its current terminal node and does not pre-route the multicast flow further downstream. For example, with reference to FIGS. 3B-3C, in response to the determination 350D that the link 212F has insufficient available BW to accommodate the tributary multicast flow 314, the controller 120 or one or more components thereof maintain the tributary multicast flow 314 at the MC node 206F and does not transmit/route the tributary multicast flow 314 to the MC node 206G. For example, with reference to FIG. 3D, after transmitting/routing the tributary flow 312 to the MC node 206D and determining that the MC node 206D is an edge node, the controller 120 or one or more components thereof maintain the tributary multicast flow 312 at the MC node 206D and does attempt to pre-route the tributary multicast flow 312 further downstream.

In some implementations, as represented by block 5-9, the method 500 optionally includes monitoring available BW of links associated with the multicast flow between its upstream source and the current terminal node. In some implementations, the controller 120 or one or more components thereof monitors the available BW of links associated with the multicast flow between its upstream source and the current terminal node. For example, with reference to FIG. 3D, the controller 120 or one or more components thereof monitor the available BW of links 212A, 212B, 212C, and 212E.

In some implementations, as represented by block 5-9A, the method 500 optionally includes trimming the multicast flow. In some implementations, the controller 120 or one or more components thereof (e.g., the BW decision logic 122) dynamically determine whether links associated with the multicast flow between its upstream source and the current terminal node have sufficient available BW to accommodate the multicast flow. If a respective link associated with the multicast flow has insufficient available BW to accommodate the multicast flow the multicast flow is pruned (or evicted) from the respective link. For example, a new unicast flow that traverses the link reserves a predetermined amount of BW that causes the respective link to no longer have sufficient available BW to accommodate the multicast flow. For example, with reference to FIGS. 4D-4E, the controller 120 or one or more components thereof prune the tributary multicast flow 422 from the link 212C and is no longer transmitted from the MC node 206C to the MC node 206D. For example, during a next time window, the available BW of the link 212C is insufficient to accommodate the tributary multicast flow 422 due to a change in BW demand (e.g., a new flow or tunnel reserves additional BW).

Figure 6:
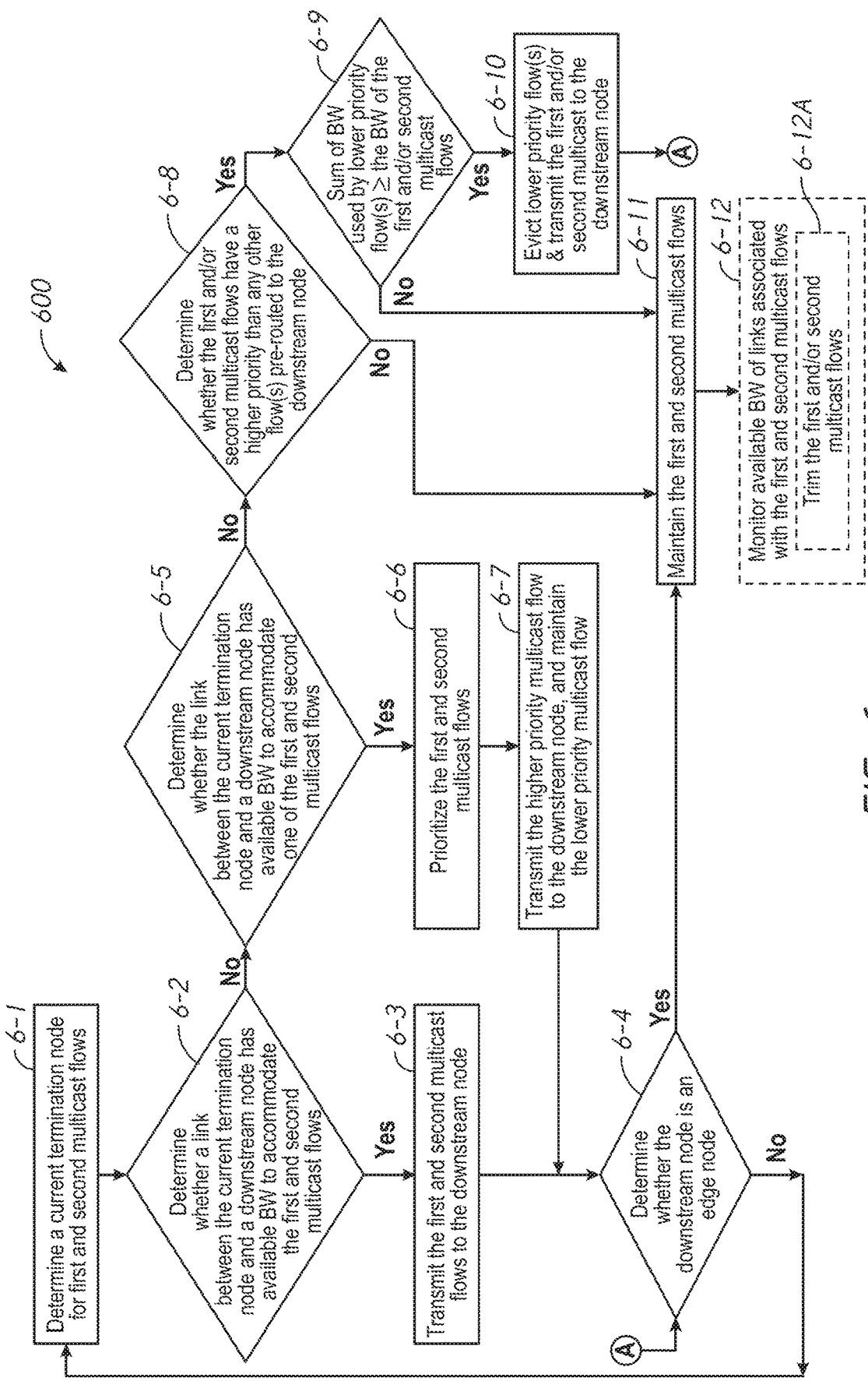
FIG. 6 is a flowchart representation of a method of pre-routing multicast flows within a network to reduce multicast flow join latency in accordance with some implementations.

FIG. 6 is a flowchart representation of a method 600 of pre-routing multicast flows within a network to reduce joining latency in accordance with some implementations. In various implementations, the method 600 is performed by a controller (e.g., the controller 120 in FIG. 1, FIGS. 3A-3F, and FIGS. 4A-4F). In some implementations, the method 600 is performed by processing logic, including hardware, firmware, software, or a combination thereof. In some implementations, the method 600 is performed by a processor executing code stored in a non-transitory computer-readable medium (e.g., a memory).

To that end, as represented by block 6-1, the method 600 includes determining a current termination node for first and second multicast flows. In some implementations, the controller 120 or one or more components thereof determine the current termination node for the first and second multicast flows in response to detecting a trigger event such as instantiation of the first and second multicast flows or reception a command from an application to pre-route multicast flows in order to reduce associated joining latency. For example, with reference to FIG. 4A, the controller 120 or one or more components thereof determine that the MC node 206A is the current termination node of the multicast flows 410 and 420.

As represented by block 6-2, the method 600 includes determining whether a link between the current termination node and a downstream node has available BW to accommodate the first and second multicast flows. In some implementations, the controller 120 or one or more components thereof (e.g., the BW decision logic 122) determine whether the link between the current termination node (determined in block 6-1) and the downstream node has sufficient available BW to accommodate both of the first and second multicast flows. According to some implementations, the downstream node is a downstream next hop node in relation to current termination node. In some implementations, the determination is made with respect to respective links of multiple downstream nodes.

For ease of explanation, the determination at block 6-2 is discussed independent of similar determinations at other downstream nodes. However, as will be understood by one of ordinary skill in the art, the pre-routing of the flows 410 and 420 in the network 205 shown in FIG. 4A need not happen sequentially in various implementations. According to some implementations, the controller 120 or one or more components thereof (e.g., the BW decision logic 122 and pre-routing logic 126) have complete picture of the network 205 and available BW on the links 212. As such in some implementations, the controller 120 or one or more components thereof determines how far the flows 410 and 420 can be pre-routed within the network 205 and issues pre-routing commands to each of the MC nodes 206 in parallel in order to reduce overall setup time.

For example, with reference to FIG. 4A, the controller 120 or one or more components thereof (e.g., the BW decision logic 122) perform determinations 450A and 450B. With reference to determination 450A, the controller 120 or one or more components thereof (e.g., the BW decision logic 122) determine whether link 212A between the MC node 206A (e.g., the current termination node) and the MC node 206B (e.g., a first downstream next hop node) has available BW to accommodate both of the multicast flows 410 and 420. With reference to determination 450B, the controller 120 or one or more components thereof (e.g., the BW decision logic 122) determine whether link 212E between the MC node 206A (e.g., the current termination node) and the MC node 206F (e.g., a second downstream next hop node) has available BW to accommodate both of the multicast flows 410 and 420.

If the link between the current termination node and the downstream node does not have available BW to accommodate the first and second multicast flows ("No" path from block 6-2), the method 600 continues to block 6-5. As such, a portion of the BW of the link is currently reserved, and the available BW of the link is insufficient to accommodate pre-routing of the first and second multicast flows to the downstream node. If the link between the current termination node and the downstream node has available BW to accommodate the first and second multicast flows ("Yes" path from block 6-2), the method 600 continues to block 6-3. As such, the available BW of the link is sufficient to accommodate pre-routing of the first and second multicast flows to the downstream node.

As represented by block 6-3, the method 600 includes transmitting the first and second multicast flows to the downstream node. In some implementations, the controller 120 or one or more components thereof (e.g., the pre-routing logic 126) transmit/route the first and second multicast flows to the downstream node. For example, with reference to FIGS. 4A-4B, in response to the determination 450A that the link 212A has sufficient available BW to accommodate the multicast flows 410 and 420, the controller 120 or one or more components thereof (e.g., the pre-routing logic 126) transmit/route the multicast flows 410 and 420 to the MC node 206B via tributary multicast flows 412 and 422, respectively. Continuing with this example, with reference to FIGS. 4A-4B, in response to the determination 450B that the link 212E has sufficient available BW to accommodate the multicast flows 410 and 420, the controller 120 or one or more components thereof (e.g., the pre-routing logic 126) transmit/route the multicast flows 410 and 420 to the MC node 206F via tributary multicast flows 414 and 424, respectively.

As represented by block 6-4, the method 600 includes determining whether the downstream node is an edge node. In some implementations, the controller 120 or one or more components thereof determines whether the downstream node is an edge node. For example, with reference to FIGS. 4A-4F, the MC nodes 206D, 206E, and 206G correspond to edge nodes of the network 205. For example, an edge node is gateway node to an end-user node/device. In another example, an edge node is associated with the edge of the core network, and the edge node is communicatively coupled with a gateway node to an end-user node/device.

If the downstream node is the edge node ("Yes" path from block 6-4), the method 600 continues to block 6-11. As such, the controller 120 has pre-routed the multicast flows to the edge of the core network. According to some embodiment, the controller 120 ceases to pre-route the multicast flow once the multicast flow reaches an edge node. If the downstream node is not the edge node ("No" path from block 6-4), the method 600 continues to block 6-1. As such, the controller 120 has pre-routed the multicast flows to a non-edge node of the core network. According to some embodiment, the controller 120 continues to pre-route the multicast flows until the multicast flows reach an edge node.

As represented by block 6-5, the method 600 includes determining whether the link between the current termination node and a downstream node has available BW to accommodate one of the first and second multicast flows. In some implementations, the controller 120 or one or more components thereof (e.g., the BW decision logic 122) determine whether the link between the current termination node (determined in block 5-1) and the downstream node has sufficient available BW to accommodate one of the first and second multicast flows. For example, with reference to FIG. 4C, after determining that the link 212C has insufficient BW to accommodate both of the tributary multicast flows 412 and 422 (e.g., the first and second multicast flows), the controller 120 or one or more components thereof (e.g., the BW decision logic 122) determine whether link 212C between the MC node 206C (e.g., the current termination node) and the MC node 206D (e.g., a first downstream next hop node) has available BW to accommodate either of the tributary multicast flows 412 and 422. In another example, with reference to FIG. 4C, after determining that the link 212H has insufficient BW to accommodate both of the tributary multicast flows 412 and 422 (e.g., the first and second multicast flows), the controller 120 or one or more components thereof (e.g., the BW decision logic 122) determine whether link 212H between the MC node 206C (e.g., the current termination node) and the MC node 206H (e.g., a second downstream next hop node) has available BW to accommodate either of the tributary multicast flows 412 and 422.

If the link between the current termination node and the downstream node has available BW to accommodate one of the first and second multicast flows ("Yes" path from block 6-5), the method 600 continues to block 6-6. As such, the available BW of the link is sufficient to accommodate pre-routing of one of the first or second multicast flows to the downstream node. As one example, with reference to FIGS. 4C-4D, the BW of the link 212C is 100 Gbps, and the current reserved BW associated with the link 212A is 75 Gbps. As such, in this example, the available BW of the link 212C is 35 Gbps. Continuing with this example, the BW of the tributary multicast flow 412 is 15 Gbps and the BW of the tributary multicast flow 422 is 15 Gbps. Thus, the link 212C has sufficient BW to accommodate one but not both of the tributary multicast flows 412 and 422 because the available BW of the link 212C is less than sum of the BW of the tributary multicast flows 412 and 422 (e.g., 25 Gbps<30 Gbps).

If the link between the current termination node and the downstream node does not have available BW to accommodate one of the first and second multicast flows ("No" path from block 6-5), the method 600 continues to block 6-8. As such, a portion of the BW of the link is currently reserved, and the available BW of the link is insufficient to accommodate pre-routing of either the first or second multicast flows to the downstream node. As one example, with reference to FIGS. 4C-4D, the BW of the link 212H is 100 Gbps, and the current reserved BW associated with the link 212A is 90 Gbps. As such, in this example, the available BW of the link 212H is 10 Gbps. Continuing with this example, the BW of the tributary multicast flow 412 is 15 Gbps and the BW of the tributary multicast flow 422 is 15 Gbps. Thus, the link 212H has insufficient BW to accommodate either of the tributary multicast flows 412 or 422 because the available BW of the link 212H is less than sum of the BW of the tributary multicast flows 412 and 422 (e.g., 10 Gbps<30 Gbps).

As represented by block 6-6, the method 600 includes prioritizing the first and second multicast flows. In some implementations, the controller 120 or one or more components thereof (e.g., the prioritization logic 124) determine a prioritization value for each of the first and second multicast flows. In some implementations, a prioritization value for a respective multicast flow is a function of at least one of: the bitrate of the respective multicast flow, a number of listeners of the respective multicast flow, the content type of respective multicast flow (e.g., audio flows have higher prioritization values than video flows), an importance value set by the MC source node, an importance value set by the destination node, or the like. In some implementations, a prioritization value for a respective multicast flow is a reflection of how frequently and/or how soon a flow is likely to be requested by a client device (e.g., one of the destination nodes 204 in FIGS. 3A-3F). For example, this is calculated by the controller 120 or the destination nodes 204 based on predicted and/or historic traffic statistics, and/or the like.

As represented by block 6-7, the method 600 includes transmitting the higher priority multicast flow to the downstream node. For example, with reference to FIG. 4D, in response to the determination 450E that the link 212C has insufficient available BW to accommodate both of the tributary multicast flows 412 and 422 but sufficient available BW to accommodate one of the tributary multicast flows 412 or 422, the controller 120 or one or more components thereof (e.g., the pre-routing logic 126) transmit/route the tributary multicast flow 422 (e.g., the higher priority multicast flow) from the MC node 206C to the MC node 206D and maintain the tributary multicast flow 412 (e.g., the lower priority multicast flow) at the MC node 206C.

As represented by block 6-8, the method 600 includes determining whether the first and/or second multicast flows have a higher priority than any other flow pre-routed to the downstream node. According to some implementations, after determining that the link between the current termination node and the downstream node does not have available BW to accommodate the first and second multicast flows, the controller 120 or one or more components thereof (e.g., the prioritization logic 124) determine whether the first and/or second multicast flows have a higher prioritization value than any other flows previously pre-routed to the downstream node.

If the first and/or second multicast flows have a higher priority than any other flow pre-routed to the downstream node ("Yes" path from block 6-8), the method 600 continues to block 6-9. If the first and second multicast flows do not have a higher priority than any other flow pre-routed to the downstream node ("No" path from block 6-8), the method 600 continues to block 6-11.

As represented by block 6-9, the method 600 includes determining whether the sum of the bandwidth (BW) used by lower priority flow(s) is greater than or equal to the BW of the first and/or second multicast flows. According to some implementations, after determining that the first and/or second flows have a higher prioritization value than one or more other flows previously pre-routed to the downstream node, the controller 120 or one or more components thereof (e.g., the BW decision logic 122) determines whether the one or more other flows with lower prioritization values are associated with a greater or equal amount of bandwidth as the first and/or second multicast flows.

If the sum of the BW used by the lower priority flow(s) is greater than or equal to the BW of the first and/or second multicast flows ("Yes" path from block 6-9), the method 600 continues to block 6-10. If the sum of the BW used by the lower priority flow(s) is less than the BW of the first and/or second multicast flows ("No" path from block 6-9), the method 600 continues to block 6-11.

As represented by block 6-10, the method 600 includes evicting at least some the lower priority flow(s) and transmitting the first and/or second multicast flows to the downstream node. According to some implementations, after determining that the one or more other flows are associated with a greater than or equal amount of bandwidth as the first and/or second multicast flows, the controller 120 or one or more components thereof (e.g., the pre-routing logic 126) evict at least some the one or more other flows from the downstream node and routes the first and/or second multicast flows to the downstream node. For example, the controller 120 evicts the lowest priority flow(s) for which the sum of their associated BW is greater than or equal the BW associated with the first and/or second multicast flows.

According to some implementations, if both the first and second flows have a higher prioritization value than the one or more other flows previously pre-routed to the downstream node and the one or more other flows with lower prioritization values are associated with an amount of bandwidth less than the sum of the first and second multicast flows, the controller 120 or one or more components thereof (e.g., the pre-routing logic 126) evict the one or more other flows from the downstream node and routes the flow with the higher prioritization value from among the first and second multicast flows.

As represented by block 6-11, the method 600 includes maintaining the first and second multicast flows at the current terminal node (e.g., the current termination node determined in block 6-1 or the downstream node to which the first and/or second multicast flows were transmitted to in blocks 6-3, 6-7, or 6-10). For example, with reference to FIG. 4D, in response to the determination 450F that the link 212H has insufficient available BW to accommodate either of the tributary multicast flows 412 or 422, the controller 120 or one or more components thereof (e.g., the pre-routing logic 126) forego transmitting the tributary multicast flows 412 and 422 from the MC node 206C to the MC node 206H.

In some implementations, as represented by block 6-12, the method 600 optionally includes monitoring available BW of links associated with the first and second multicast flows between its upstream source and the current terminal node. In some implementations, the controller 120 or one or more components thereof monitor the available BW of links associated with the first and/or second multicast flows. For example, with reference to FIG. 4D, the controller 120 or one or more components thereof monitor the available BW of links 212A, 212B, 212C, 212E, and 212F.

In some implementations, as represented by block 6-12A, the method 600 optionally includes trimming the first multicast flow. In some implementations, the controller 120 or one or more components thereof (e.g., the BW decision logic 122) dynamically determine whether links associated with the first and/or second multicast flows have sufficient available BW to accommodate one or both of the first and/or second multicast flows. If a respective link associated with the first and second multicast flow has insufficient available BW to accommodate either of the first or second multicast flows, the first and second multicast flows are pruned (or evicted) from the respective link. For example, a new unicast flow that traverses the link reserves a predetermined amount of BW that causes the respective link to no longer have sufficient available BW to accommodate the first and second multicast flows.

If a respective link associated with the first and second multicast flow has sufficient available BW to accommodate one but not both of the first and second multicast flows, the lower priority multicast flow is pruned (or evicted) from the respective link and the higher priority multicast flow continues to be routed via the respective link. For example, with reference to FIGS. 4E-4F, the controller 120 or one or more components thereof prunes the tributary multicast flow 412 (e.g., the lower priority multicast flow) from the link 212B and continues to route the tributary multicast flow 422 (e.g., the higher priority multicast flow) to the MC node 206C. For example, during a next time window, the available BW of the link 212B is insufficient to accommodate both of the tributary multicast flows 412 and 422 due to a change in BW demand (e.g., a new flow or tunnel reserves additional BW). However, the link 212B still has available BW to accommodate one of the tributary multicast flows 412 or 422.

Figure 7:
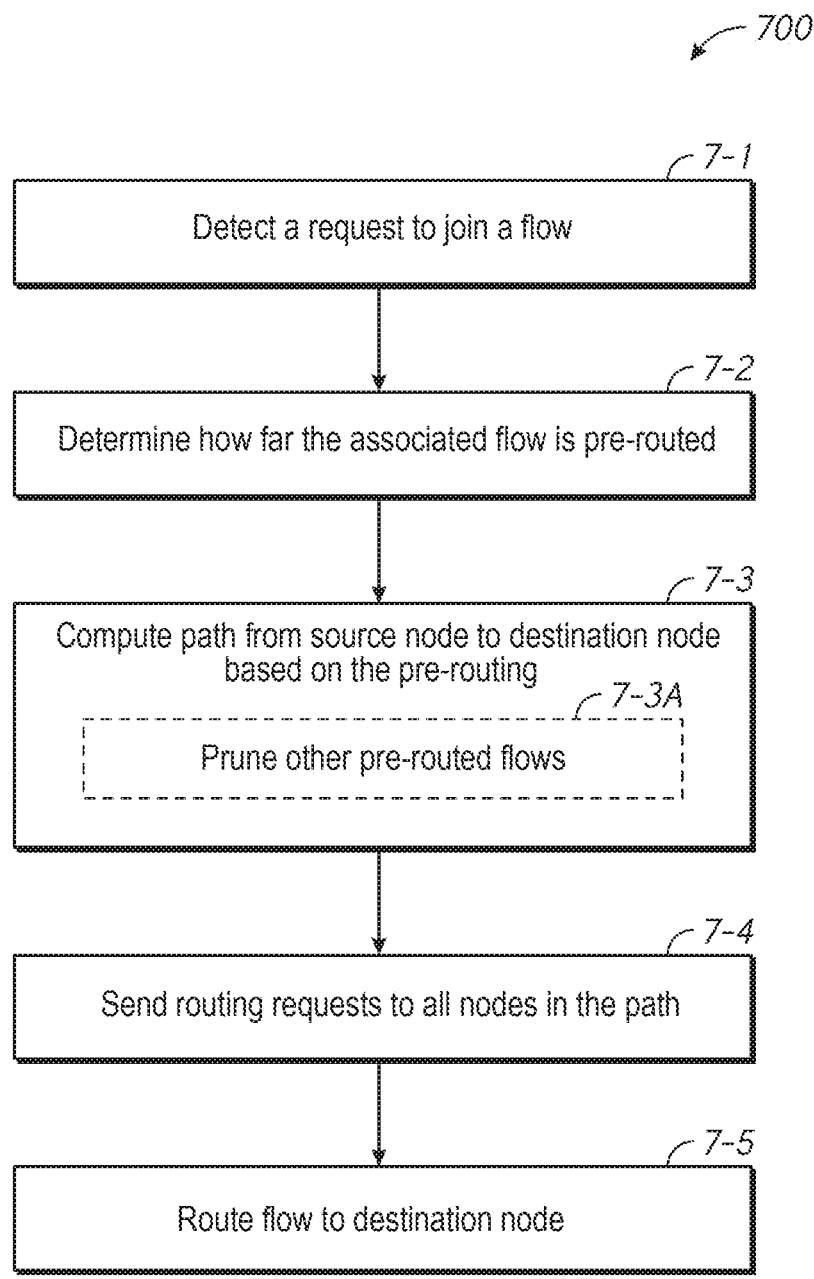
FIG. 7 is a flowchart representation of a method of routing a multicast flow in accordance with some implementations.

FIG. 7 is a flowchart representation of a method 700 of routing a multicast flow in accordance with some implementations. In various implementations, the method 700 is performed by a controller (e.g., the controller 120 in FIG. 1, FIGS. 3A-3F, and FIGS. 4A-4F). In some implementations, the method 700 is performed by processing logic, including hardware, firmware, software, or a combination thereof. In some implementations, the method 700 is performed by a processor executing code stored in a non-transitory computer-readable medium (e.g., a memory).

To that end, as represented by block 7-1, the method 700 includes detecting a request to join a flow. For example, with reference to FIG. 3D, the controller 120 or one or more components thereof detects the join request 322 from the destination node 204D.

As represented by block 7-2, the method 700 includes determining how far the associated flow is pre-routed. For example, with reference to FIG. 3D, in response to detecting the join request 322, the controller 120 or one or more components thereof determine how far the multicast flow 310 (or the tributary multicast flow 314) is pre-routed within the network 205.

As represented by block 7-3, the method 700 includes computing a path from the source node to a destination node based on the pre-routing determination. For example, with reference to FIG. 3D, the controller 120 or one or more components thereof compute a path from the MC source node 202A to the destination node 204D based on the closest MC node to which the multicast flow 310 is pre-routed (e.g., the MC node 206F).

In some implementations, as represented by block 7-3A, the method 700 includes pruning other pre-routed flows. For example, with reference to FIGS. 3D-3E, the controller 120 or one or more components thereof evict pre-routed flows from the MC nodes 206 in the computed path if any of the links in the computed path have insufficient BW to accommodate the multicast flow 310 (or the tributary multicast flow 314).

As represented by block 7-4, the method 700 includes sending routing requests to all nodes in the computed path. For example, with reference to FIGS. 3D-3E, the controller 120 or one or more components thereof send routing requests to the MC nodes 206 in the computed path (e.g., in parallel) to build a multicast distribution tree from the MC source node 202A to the destination node 204D (e.g., a multicast routing tree).

As represented by block 7-5, the method 700 includes routing the flow from the source node to the destination node according to the computed path. For example, with reference to FIG. 3D, after building the multicast distribution tree for the multicast flow 310 (or the tributary multicast flow 314), the controller 120 or one or more components thereof route the tributary multicast flow 314 from the MC node 206F through the MC node 206G to the destination node 204D according to the computed path.

Figure 8:
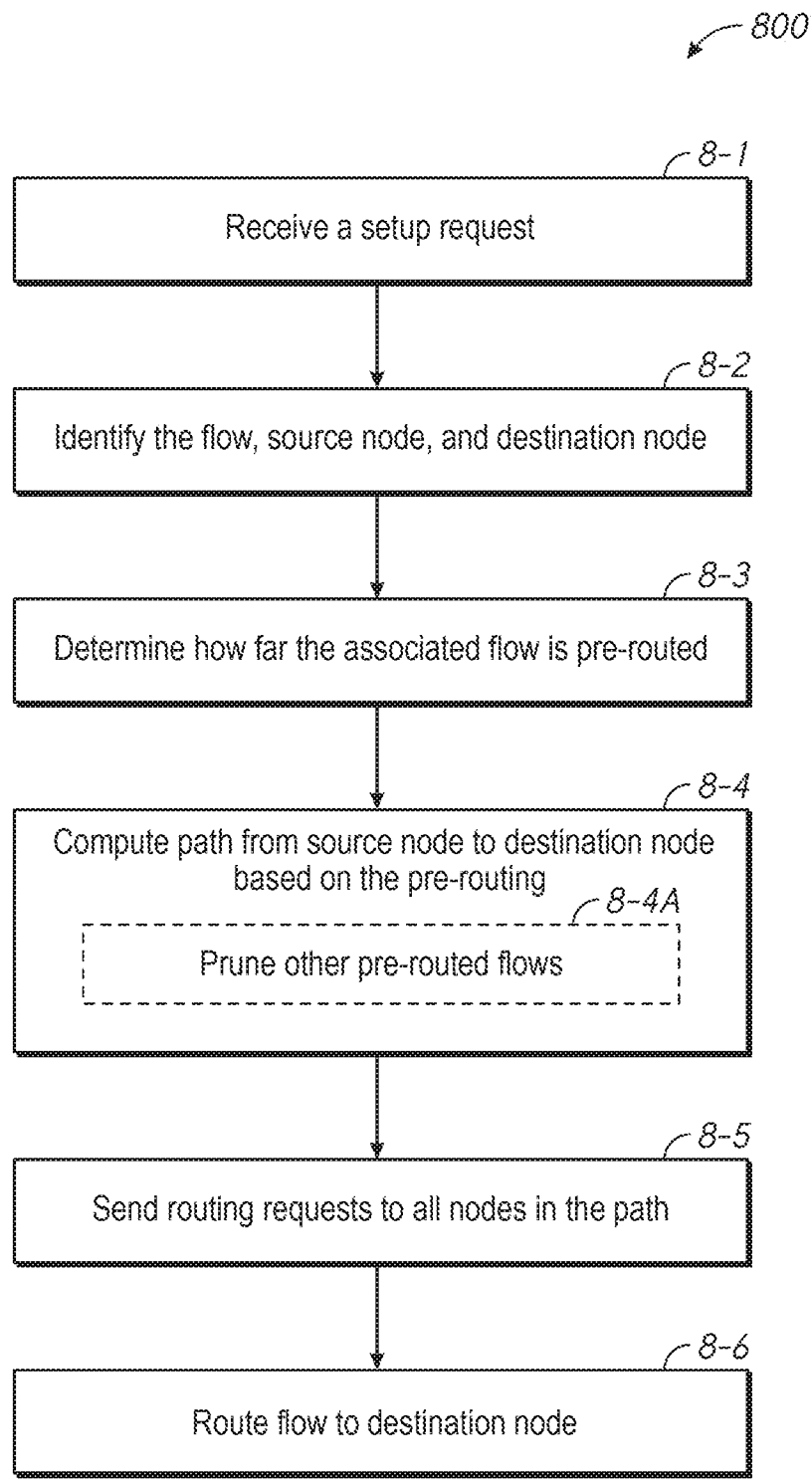
FIG. 8 is a flowchart representation of a method of routing a multicast flow in accordance with some implementations.

FIG. 8 is a flowchart representation of a method 800 of routing a multicast flow in accordance with some implementations. In various implementations, the method 800 is performed by a controller (e.g., the controller 120 in FIG. 1, FIGS. 3A-3F, and FIGS. 4A-4F). In some implementations, the method 800 is performed by processing logic, including hardware, firmware, software, or a combination thereof. In some implementations, the method 800 is performed by a processor executing code stored in a non-transitory computer-readable medium (e.g., a memory).

To that end, as represented by block 8-1, the method 800 includes receiving a setup request. For example, with reference to FIG. 3A, the controller 120 receives a flow setup request from an external entity such as a broadcast controller.

As represented by block 8-2, the method 800 includes identifying a flow, source node, and a destination node associated with the setup request. For example, with reference to FIG. 3A, the controller 120 identifies a flow, one of the MC source nodes 202, and at least one of the destination nodes 204 based on the flow setup request.

As represented by block 8-3, the method 800 includes determining how far the associated flow is pre-routed. example, with reference to FIG. 3A, the controller 120 determines how far the flow has been pre-routed within the network 205.

As represented by block 8-4, the method 800 includes computing a path from the source node to a destination node based on the pre-routing determination. For example, with reference to FIG. 3A, the controller 120 computes a path from one of the MC source nodes 202 to at least one of the destination nodes 204 based on the closest one of the MC nodes 206 to which the flow 310 is pre-routed.

In some implementations, as represented by block 8-4A, the method 800 includes pruning other pre-routed flows. For example, with reference to FIG. 3A, the controller 120 evicts pre-routed flows from the MC nodes in the computed path if any of the links in the computed path have insufficient BW to accommodate the flow.

As represented by block 8-5, the method 800 includes sending a routing requests to all nodes in the computed path. For example, with reference to FIG. 3A, the controller 120 sends routing requests to the MC nodes 206 in the computed path (e.g., in parallel) to build a multicast distribution tree from one of the MC source nodes 202 to at least one of the destination nodes 204.

As represented by block 8-6, the method 800 includes routing the flow from the source node to the destination node according to the computed path. For example, with reference to FIG. 3A, the controller 120 routes the flow from one of the MC source nodes 202 to at least one of the destination nodes 204 according to the computed path.

Figure 9:
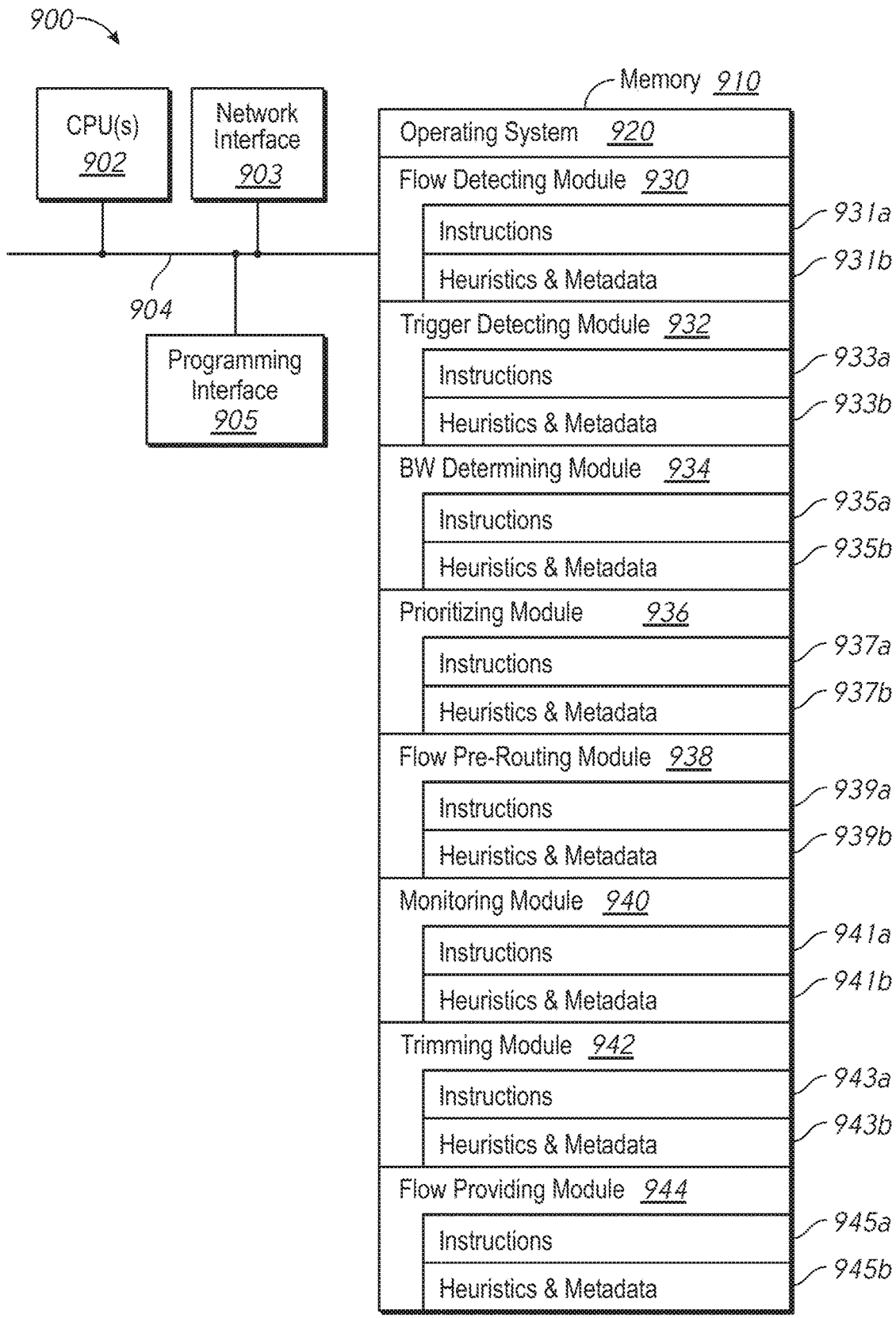
FIG. 9 is a block diagram of an example device in accordance with some implementations.

FIG. 9 is a block diagram of an example of a device 900 in accordance with some implementations. For example, in some implementations, the device 900 is similar to and adapted from the controller 120 in FIG. 1, FIGS. 3A-3F, and FIGS. 4A-4F. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units (CPUs) 902, a network interface 903, a memory 910, a programming (I/O) interface 905, and one or more communication buses 904 for interconnecting these and various other components.

In some implementations, the one or more communication buses 904 include circuitry that interconnects and controls communications between system components. The memory 910 includes high-speed random access memory, such as DRAM, SRAM, DDR RAM, or other random access solid state memory devices. In some implementations, the memory 910 includes non-volatile memory, such as one or more magnetic disk storage devices, optical disk storage devices, flash memory devices, or other non-volatile solid state storage devices. The memory 910 optionally includes one or more storage devices remotely located from the one or more CPUs 902. The memory 910 comprises a non-transitory computer readable storage medium. In some implementations, the memory 910 or the non-transitory computer readable storage medium of the memory 910 stores the following programs, modules and data structures, or a subset thereof including an optional operating system 920, a flow detecting module 930, a trigger detecting module 932, a bandwidth (BW) determining module 934, a prioritizing module 936, a flow pre-routing module 938, a monitoring module 940, a trimming module 942, and a flow providing module 944.

The operating system 920 includes procedures for handling various basic system services and for performing hardware dependent tasks.

In some implementations, the flow detecting module 930 is configured to determine the current termination node for multicast flow(s). To that end, in various implementations, the flow detecting module 930 includes instructions and/or logic 931a, and heuristics and metadata 931b.

In some implementations, the trigger detecting module 932 is configured to detect a trigger event, such as instantiation of the multicast flow or reception a command from an application, to pre-route multicast flows in order to reduce associated joining latency. To that end, in various implementations, the trigger detecting module 932 includes instructions and/or logic 933a, and heuristics and metadata 933b.

In some implementations, the BW determining module 934 is configured to determine whether a link between a current termination node and a downstream node has available BW to accommodate multicast flow(s). To that end, in various implementations, the BW determining module 934 includes instructions and/or logic 935a, and heuristics and metadata 935b.

In some implementations, the prioritizing module 936 is configured to determine priority values for two or more multicast flows when a link has sufficient BW to accommodate one of the two or more multicast flows. To that end, in various implementations, the prioritizing module 936 includes instructions and/or logic 937a, and heuristics and metadata 937b.

In some implementations, the flow pre-routing module 938 is configured to transmit/route the multicast flow from the current termination node to the downstream node based on determinations by the BW determining module 934 and/or the prioritizing module 936. To that end, in various implementations, the flow pre-routing module 938 includes instructions and/or logic 939a, and heuristics and metadata 939b.

In some implementations, the monitoring module 940 is configured to monitor the available bandwidth of links associated with the multicast flows pre-routed by the flow pre-routing module 938. To that end, in various implementations, the monitoring module 940 includes instructions and/or logic 941a, and heuristics and metadata 941b.

In some implementations, the trimming module 942 is configured to evict pre-routed multicast flows from links that no longer have available BW to accommodate the pre-routed multicast flows. To that end, in various implementations, the trimming module 942 includes instructions and/or logic 943a, and heuristics and metadata 943b.

In some implementations, the flow providing module 944 is configured to route a multicast flow to a destination in response to a request to join or subscribe to the multicast flow. To that end, in various implementations, the flow providing module 944 includes instructions and/or logic 945a, and heuristics and metadata 945b.

Although the flow detecting module 930, the trigger detecting module 932, the BW determining module 934, the prioritizing module 936, the flow pre-routing module 938, the monitoring module 940, the trimming module 942, and the flow providing module 944 are illustrated as residing on a single device (i.e., the device 900), it should be understood that in other implementations, any combination of the flow detecting module 930, the trigger detecting module 932, the BW determining module 934, the prioritizing module 936, the flow pre-routing module 938, the monitoring module 940, the trimming module 942, and the flow providing module 944 reside on a separate device.

Moreover, FIG. 9 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    determining a first node as a current termination node of a first multicast flow and a current termination node of a second multicast flow, wherein the first multicast flow is routed along a first path beginning from a first multicast source node and ending at the current termination node of the first multicast flow, and wherein the second multicast flow is routed along a second path beginning from a second multicast source node and ending at the current termination node of the second multicast flow;
    determining that a link between the first node and a downstream next-hop node has available bandwidth to accommodate the first multicast flow and the second multicast flow, wherein the downstream next-hop node is not in the first path and the second path;
    determining the downstream next-hop node as the current termination node of the first multicast flow and the second multicast flow;
    determining that the link has available bandwidth to concurrently accommodate the first multicast flow and the second multicast flow;
    transmitting the first multicast flow and the second multicast flow to the downstream next-hop node in response to determining that the link between the first node and the downstream next-hop node has the available bandwidth to accommodate the first multicast flow and the second multicast flow;
    determining the available bandwidth of the link between the first node and the downstream next-hop node, for a next time window, while transmitting the first multicast flow and the second multicast flow to the downstream next-hop node;
    determining a first priority value associated with the first multicast flow and a second priority value associated with the second multicast flow in response to determining that the link between the first node and the downstream next-hop node does not have the available bandwidth to accommodate the first multicast flow and the second multicast flow during the next time window; and
    continuing transmitting one of the first multicast flow and the second multicast flow to the downstream next-hop node based on the first priority value and the second priority value in response to determining that the link does not have the available bandwidth to accommodate the first multicast flow and the second multicast flow during the next time window.

2. The method of claim 1, wherein transmitting one of the first multicast flow and the second multicast flow further comprising maintaining the first node as the current termination node of the first multicast flow and maintaining the multicast flow at the first node according to a determination that the link between the first node and the downstream next-hop node does not have available bandwidth to accommodate the first multicast flow in the next time window.

3. The method of claim 1, further comprising:
    determining whether the first multicast flow is associated with a respective priority value that is higher than any other existing multicast flows pre-routed to the downstream next-hop node;
    determining whether bandwidth associated one or more existing lower priority multicast flows is greater than or equal to bandwidth associated with the first multicast flow determined to have the higher priority value; and
    evicting at least some of the one or more existing lower priority multicast flows in response to a determination that the bandwidth associated one or more existing lower priority multicast flows is greater than or equal to bandwidth associated with the first multicast flow.

4. The method of claim 1, further comprising:
    detecting a request to join the first multicast flow from a client device; and
    routing the first multicast flow to the client device.

5. The method of claim 4, wherein routing the first multicast flow to the client device includes:
    computing a path from a source node of the first multicast flow to the client device based on the transmission of the first multicast flow to the downstream next-hop node; and
    routing the first multicast flow from the source node to the client device according to the computed path.

6. The method of claim 1, wherein determining the first node as the current termination node of the first multicast flow includes determining the first node as the current termination node of the first multicast flow in response to receiving a request to pre-route the first multicast flow towards an edge node associated with a client device, wherein the downstream next-hop node is a located between the first node and the client device.

7. The method of claim 1, further comprising:
    ceasing to transmit other of the first multicast flow and the second multicast flow to the downstream next-hop node according to a determination that the link between the first node and a downstream next-hop node does not have available bandwidth to accommodate the first multicast flow during the next time window.

8. The method of claim 7, further comprising:
    continuing transmitting the second multicast flow to the downstream next-hop node and ceasing to transmit the first multicast flow to the downstream next-hop node during the next time window when the second priority value associated with the second multicast flow exceeds the first priority value associated with the first multicast flow.

9. The method of claim 7, further comprising continuing transmitting the first multicast flow to the downstream next-hop node and ceasing transmission of the second multicast flow to the downstream next-hop node during the next time window when the first priority value exceeds the second priority value.

10. A device comprising:
    a memory storage; and a processing unit coupled to the memory storage, wherein the processing unit is operative to:

determine a first node as a current termination node of a first multicast flow and a second multicast flow, wherein the first multicast flow is routed along a first path beginning from a first multicast source node and ending at the current termination node of the first multicast flow, and wherein the second multicast flow is routed along a second path beginning from a second multicast source node and ending at the current termination node of the second multicast flow;

determine that a link between the first node and a downstream next-hop node has available bandwidth to accommodate the first multicast flow and the second multicast flow;

determine the downstream next-hop node as the current termination node of the first multicast flow and the second multicast flow;

transmit the first multicast flow and the second multicast flow to the downstream next-hop node in response to determining that the link between the first node and a downstream next-hop node has available bandwidth to accommodate the first multicast flow determine a first priority value associated with the first multicast flow and a second priority value associated with the second multicast flow in response to determining that the link between does not have the available bandwidth to accommodate the first multicast flow and the second multicast flow during a next time window; and continue to transmit of one of the first multicast flow and the second multicast flow to the downstream next-hop node based on the first priority value and the second priority value in response to determining that the link does not have the available bandwidth to accommodate the first multicast flow and the second multicast flow during the next time window.

11. The device of claim 10, wherein the processing unit is further operative to maintain the first node as the current termination node of the first multicast flow and maintain the multicast flow at the first node according to a determination that the link between the first node and a downstream next-hop node does not have available bandwidth to accommodate the first multicast flow.

12. The device of claim 10, wherein determining the first node as the current termination node of the first multicast flow includes determining the first node as the current termination node of the first multicast flow in response to receiving a request to pre-route the first multicast flow towards an edge node associated with a client device, wherein the downstream next-hop node is a located between the first node and the client device.

13. The device of claim 10, wherein the processing unit is further operative to:

cease to transmit other of the first multicast flow and the second multicast flow to the downstream next-hop node according to a determination that the link between the first node and a downstream next-hop node does not have available bandwidth to accommodate the first multicast flow and the second multicast flow during the next time window.

14. The device of claim 10, wherein the processing unit is further operative to continue transmitting the first multicast flow to the downstream next-hop node and cease transmitting the second multicast flow to the downstream next-hop node during the next time window when the first priority value exceeds the second priority value.

15. The device of claim 10, wherein the processing unit is further operative to continue transmitting the second multicast flow to the downstream next-hop node and ceasing transmitting the first multicast flow to the downstream next-hop node during the next time window when the second priority value exceeds the first priority value.

16. A non-transitory computer readable medium comprising instructions which when executed perform a method comprising:

determining a first node as a current termination node of a first multicast flow and a second multicast flow, wherein the first multicast flow is routed along a first path beginning from a first multicast source node and ending at the current termination node of the first multicast flow, and wherein the second multicast flow is routed along a second path beginning from a second multicast source node and ending at the current termination node of the second multicast flow;

determine whether a link between the first node and a downstream next-hop node has available bandwidth to accommodate the first multicast flow;

determining the downstream next-hop node as the current termination node of the first multicast flow and the second multicast flow;

transmitting the first multicast flow to the downstream next-hop node according to a determination that the link between the first node and a downstream next-hop node has available bandwidth to accommodate the first multicast flow determining the available bandwidth of the link for a next time window;

determining a first priority value associated with the first multicast flow and a second priority value associated with the second multicast flow in response to determining that the link between the first node and a downstream next-hop node does not have the available bandwidth to accommodate the first multicast flow and the second multicast flow during the next time window; and continuing transmitting one of the first multicast flow and the second multicast flow to the downstream next-hop node based on the first priority value and the second priority value in response to determining that the link does not have the available bandwidth to accommodate the first multicast flow and the second multicast flow during the next time window.

17. The non-transitory memory of claim 16, wherein the instructions when executed perform the method further comprising to maintain the first node as the current termination node of the first multicast flow and maintain the multicast flow at the first node according to a determination that the link between the first node and a downstream next-hop node does not have available bandwidth to accommodate the first multicast flow.

18. The non-transitory memory of claim 16, wherein the instructions when executed perform the method further comprising ceasing to transmit other of the first multicast flow and the second multicast flow to the downstream next-hop node based on determining that the link does not have available bandwidth to accommodate the first multicast flow and the second multicast flow during the next time window.

19. The non-transitory memory of claim 16, wherein the instructions when executed perform the method further comprising continuing transmitting the second multicast flow to the downstream next-hop node and ceasing transmitting the first multicast flow to the downstream next-hop node during the next time window when the second priority value exceeds the first priority value.

20. The non-transitory memory of claim 16, wherein the instructions when executed perform the method further comprising continuing transmitting the first multicast flow to the downstream next-hop node and ceasing transmitting the second multicast flow to the downstream next-hop node during the next time window when the first priority value exceeds the second priority value.

\* \* \* \* \*